(12) United States Patent
Ishibashi

(10) Patent No.: US 8,754,743 B2
(45) Date of Patent: Jun. 17, 2014

(54) ELECTRIC VEHICLE, TAXING SERVER, CHARGING APPARATUS, DRIVE MANAGEMENT METHOD, AND PROGRAM

(75) Inventor: Yoshihito Ishibashi, Tokyo (JP)

(73) Assignee: Sony Corporation, Tokyo (JP)

( * ) Notice: Subject to any disclaimer, the term of this patent is extended or adjusted under 35 U.S.C. 154(b) by 800 days.

(21) Appl. No.: 12/958,169

(22) Filed: Dec. 1, 2010

(65) Prior Publication Data

US 2011/0140835 A1 Jun. 16, 2011

(30) Foreign Application Priority Data

Dec. 16, 2009 (JP) ................................. 2009-285441

(51) Int. Cl.
| | | |
|---|---|---|
| *G05B 19/00* | (2006.01) | |
| *B60R 25/10* | (2013.01) | |
| *H02J 7/00* | (2006.01) | |
| *G06Q 40/00* | (2012.01) | |
| *G01M 17/00* | (2006.01) | |
| *H02J 7/04* | (2006.01) | |
| *G06Q 50/06* | (2012.01) | |
| *G06Q 20/14* | (2012.01) | |
| *H04L 29/06* | (2006.01) | |
| *B60L 11/18* | (2006.01) | |
| *G07F 15/00* | (2006.01) | |

(52) U.S. Cl.
CPC ............ *H02J 7/04* (2013.01); *H02J 2007/0001* (2013.01); *Y02T 10/7005* (2013.01); *Y02T 90/128* (2013.01); *Y02T 90/14* (2013.01); *Y02T 90/127* (2013.01); *Y02T 10/7088* (2013.01); *Y02T 90/169* (2013.01); *Y02T 90/163* (2013.01); *Y02T 10/725* (2013.01); *G06Q 50/06* (2013.01); *G06Q 20/145* (2013.01); *H04L 63/08* (2013.01); *B60L 11/1838* (2013.01); *B60L 11/1846* (2013.01); *B60L 2210/20* (2013.01); *B60L 11/1824* (2013.01); *B60L 11/1848* (2013.01); *Y04S 30/14* (2013.01); *G07F 15/005* (2013.01); *G07F 15/003* (2013.01)
USPC .......... 340/5.2; 340/426.1; 320/109; 320/125; 320/155; 705/40; 705/412; 701/29.6; 701/33.4; 701/450; 701/22

(58) Field of Classification Search
USPC .......................... 340/5.2, 426.1; 320/125, 155
See application file for complete search history.

(56) References Cited

U.S. PATENT DOCUMENTS

| | | | |
|---|---|---|---|
| 2006/0122852 A1 | 6/2006 | Moudy | |
| 2007/0253218 A1 | 11/2007 | Tanabe | |
| 2009/0043450 A1* | 2/2009 | Tonegawa et al. | .............. 701/36 |
| 2009/0201198 A1 | 8/2009 | Moudy | |
| 2009/0213301 A1 | 8/2009 | Tanabe | |

(Continued)

FOREIGN PATENT DOCUMENTS

| | | |
|---|---|---|
| JP | 2009-201198 | 9/2009 |
| JP | 2009-213301 | 9/2009 |

*Primary Examiner* — Brent Swarthout
*Assistant Examiner* — Fekadeselassie Girma
(74) *Attorney, Agent, or Firm* — Oblon, Spivak, McClelland, Maier & Neustadt, L.L.P.

(57) ABSTRACT

An electronic device that includes an interface that connects to a charging apparatus and exchanges authentication information with a server via a network. The electronic device also includes a control unit that controls charging of a battery of the electronic device based on power received from the charging apparatus. Upon completion of the charging operation, the interface of the electronic device transmits information for calculating a tax based on the charging operation to the server.

16 Claims, 10 Drawing Sheets

SYSTEM CONFIGURATION EXAMPLE

(56) References Cited

U.S. PATENT DOCUMENTS

| | | | |
|---|---|---|---|
| 2009/0251300 A1* | 10/2009 | Yasuda et al. | 340/426.1 |
| 2010/0013433 A1* | 1/2010 | Baxter et al. | 320/109 |
| 2010/0161483 A1* | 6/2010 | Littrell | 705/40 |
| 2010/0207588 A1* | 8/2010 | Lowenthal et al. | 320/165 |
| 2010/0274656 A1* | 10/2010 | Genschel et al. | 705/14.27 |
| 2011/0099144 A1* | 4/2011 | Levy et al. | 707/609 |
| 2011/0144844 A1* | 6/2011 | Ishibashi | 701/22 |

* cited by examiner

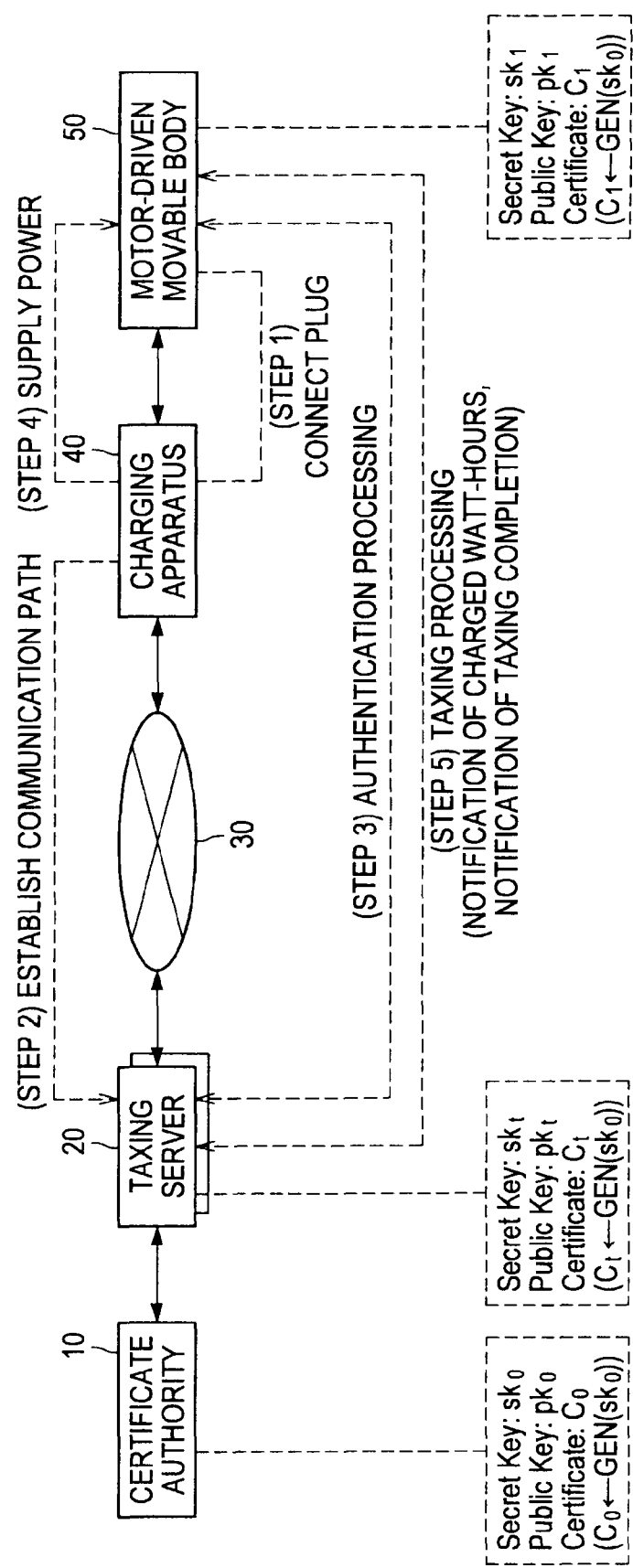

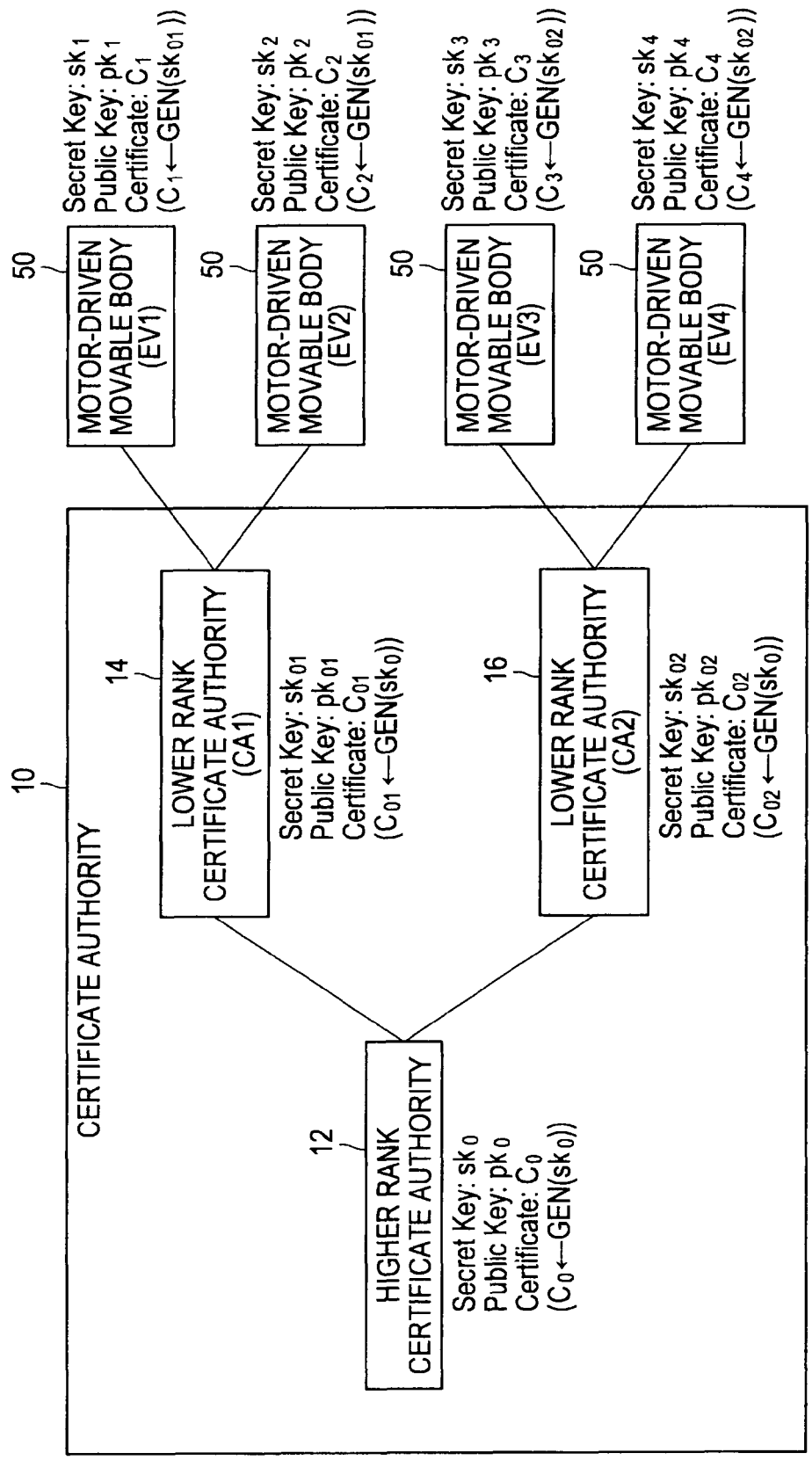
FIG.2 CONFIGURATION EXAMPLE OF PUBLIC KEY CERTIFICATE

ELECTRIC VEHICLE, TAXING SERVER, CHARGING APPARATUS, DRIVE MANAGEMENT METHOD, AND PROGRAM

CROSS REFERENCE TO RELATED APPLICATION

This application claims the benefit of priority under 35 U.S.C. §119 from Japanese Priority Patent Application JP 2009-285441 filed in the Japan Patent Office on Dec. 16, 2009, the entire contents of which is hereby incorporated by reference.

BACKGROUND OF THE INVENTION

1. Field of the Invention

The present invention relates to a electric vehicle, a taxing server, a charging apparatus, a drive management method, and a program.

2. Description of the Related Art

In recent years, a technology called a smart grid has gained attention. The smart grid is a technical framework to realize efficient power usage by constructing a new transmission network having a communication channel along with the transmission network and using the intelligent transmission network. The idea of the smart grid, as a background, is to realize efficient management of power usage, swift handling of an incident when such an incident occurs, remote control of power usage, distributed power generation using power generation facilities outside the control of a power company, or charging management of a electric vehicle. Particularly, effective utilization of in-house power generating stations using renewable energy by ordinary households or operators other than power companies and charging management of various motor-driven movable bodies typically including electric vehicles have attracted considerable attention. Incidentally, renewable energy is energy generated without using fossil fuel.

Power generated by ordinary households or operators other than power companies is used by power generation operators. Excessive power after being used by the power generation operators is currently purchased by power companies. However, purchasing power supplied from power generation facilities outside the control of a power company is a heavy burden to the power company. For example, amount of power supplied from photovoltaic power generation facilities depends on the weather. Moreover, amount of power supplied from in-house power generating stations of ordinary households depends on power usage of ordinary households that largely changes day by day. Thus, it is difficult for power companies to receive stable power supply from power generation facilities outside the control of power companies. For the above reason, it may be difficult for power companies to purchase power in the future.

Thus, a home battery initiative that uses power generated by power generation facilities outside the control of power companies after being temporarily stored in batteries has recently gained attention. For example, a method of using power generated by photovoltaic power generation facilities by storing such power in batteries and making up for shortages in the night or when the weather is bad is considered. Further, methods of limiting amount of power received from a power company in accordance with the battery storage amount and using power stored in batteries in the daytime when power rates are higher by storing power in batteries supplied by a power company in the night when power rates are lower are considered. Batteries can store power as DC, which eliminates the need for DC/AC conversion or AC/DC conversion during transmission so that losses during conversion can be reduced.

Thus, various expectations regarding power management mingle with one another amid the smart grid initiative. To realize such power management, the smart grid initiative is premised on having a communication channel along with a transmission network. That is, exchanging information about power management by using the intelligent transmission network is assumed. However, in a region where a communication infrastructure has been built, instead of using a transmission network as a communication channel, information about power management may be exchanged by using a network constructed by the deployed communication infrastructure. That is, what is important in the smart grid initiative is how efficiently to use power generation facilities and storage facilities that are not managed in a unified manner.

The power management in the smart grid initiative includes, as described above, charging management of a electric vehicle. A typical example of the electric vehicle is an electric vehicle (EV). However, in addition to the electric vehicles, for example, motor-driven bicycles, electric buses, motor-driven freight cars, motor-driven ships, and motor-driven planes can also be considered as motor-driven movable bodies. Naturally, motor-driven movable bodies have accumulators or capacitors (hereinafter, denoted as batteries) mounted thereon. Motor-driven movable bodies are driven using power stored in batteries.

A battery means any unit capable of storing energy in some form and discharging energy again. Typical examples thereof include accumulators and capacitors.

As the accumulator, for example, a general accumulator such as a lithium-ion battery, nickel-metal hydride battery, lead storage battery, and NAS battery can be exemplified. Moreover, in addition to these general accumulators that can currently be used, any accumulator that will be available in the future can also be used as the accumulator. On the other hand, as the capacitor, for example, a general capacitor such as a field-effect capacitor and ceramic capacitor or a large-capacity electric double layer capacitor under development in recent years can be used.

As a system that stores electrical energy in a re-dischargeable form, a pumped storage generation system can be exemplified. The pumped storage generation system converts electrical energy into potential energy for storage. Then, when electrical energy is re-discharged, the potential energy is used to generate power. For example, water is pumped up to a higher place using electrical energy and when electrical energy is discharged, hydraulic power generation is carried out using energy that causes the water to fall. Thus, a system that converts electrical energy into potential energy can also be considered as a kind of battery.

As a mechanism to store electrical energy in a re-dischargeable form, a structure that uses electrolysis of water is known. In this mechanism, when electrical energy is stored, electrolysis of water is carried out using electrical energy and generated hydrogen is stored. Then, when electrical energy is re-discharged, the stored hydrogen is burnt to generate power or the stored hydrogen is used to generate power using fuel cells. Such a mechanism can also be considered as a kind of battery.

As described above, all structures capable of temporarily storing electrical energy by some method and providing electrical energy again can be considered as a kind of battery.

Charging facilities set up in ordinary households or charging facilities set up by various operators are used to charge batteries of a electric vehicle. For charging management of motor-driven movable bodies from charging facilities, a mechanism that allows the charging facilities to identify each electric vehicle is necessary.

Regarding such a mechanism, for example, Japanese Patent Application Laid-Open Nos. 2009-213301 and 2009-201198 disclose a method that performs authentication between charging facilities and an electric vehicle during charging by setting up a communication channel between the charging facilities and the electric vehicle. Using this method enables the charging facilities to identify the electric vehicle to be charged or the electric vehicle to identify the charging facilities to charge the vehicle. If a combination of the charging facilities and electric vehicle is identified for charging and a communication channel is established between both, various kinds of information about charged watt-hours and the like can be exchanged using the communication channel. Thus, it becomes possible to perform various kinds of charging management using information that can be exchanged via the communication channel.

SUMMARY OF THE INVENTION

Information that can be managed when an electric vehicle is charged include, for example, information about the charging facilities, information about the electric vehicle, and information about charged watt-hours. If such information is used, for example, a mechanism that enables billing and settlement of power charges in accordance with charged watt-hours during charging can be realized. However, realization of a mechanism capable of performing taxing processing of taxes imposed on the electric vehicle in accordance with charged watt-hours during charging entails great difficulties.

A gasoline charge of a vehicle usually includes taxes such as a road tax and carbon tax. The road tax is a tax specific to the vehicle imposed for the purpose of billing the driver of the vehicle for the burden of costs related to roads. The carbon tax, on the other hand, is a tax imposed on all people who use fossil fuel for the purpose of using the tax for environment maintenance. If a tax corresponding to the road tax should be imposed on all electricity used in ordinary households, taxing processing will be simpler, but a new issue arises that a tax specific to the vehicle is imposed also on electric charges used for other than charging of electric vehicles. If outlets dedicated to charging of electric vehicles are provided, it is possible to provide a mechanism to impose a tax only when the dedicated outlets are used, but a heavy burden of costs will be shouldered by parties involved because installation costs of the dedicated outlets and charge management for individual dedicated outlets will be necessary, resulting in the prevention of widespread use of electric vehicles.

Thus, the inventors devised a mechanism that directly performs taxing processing between an electric vehicle and a taxer by utilizing a smart grid infrastructure. To realize this mechanism, however, it is necessary to securely exchange information between the electric vehicle and the taxer. It is also necessary to have a mechanism to prevent tax evasion during charging. Here, an electric vehicle is taken as an example, but the issue of taxing processing is an issue that similarly applies to other motor-driven movable bodies. The present invention has been made in view of the above issues and it is desirable to provide a novel and improved electric vehicle capable of securely and reliably collecting taxes specific to a electric vehicle during charging, a taxing server, a charging apparatus, a drive management method, and a program.

According to an embodiment, the present invention is directed to an electronic device, a program executed by the electronic device, and/or a method performed by the electronic device, the electronic device including an interface configured to connect to a charging apparatus and exchange authentication information with a server via a network; a control unit configured to control charging of a battery of the electronic device based on power received from the charging apparatus, wherein the interface is configured to transmit information for calculating tax to the server.

The information for calculating the tax may be at least one of an amount of charge received by the battery, battery identification information, driver identification information and car identification information.

The interface may be configured to receive permission to initiate the charging of the battery upon an indication that authentication with the server is successful.

The interface may be configured to receive a confirmation that the server received the information for calculating the tax.

The electronic device may further comprise a drive control unit configured to disable a motor of the electronic device until the confirmation is received from the server.

The interface may be configured to exchange the authentication information with the server over the network via the charging apparatus.

The authentication information may be generated based on a secret key assigned to the electronic device.

The information for calculating the tax may be an amount of charge received by the battery.

The information for calculating the tax may be attached with a signature generated based on a secret key assigned to the electronic device.

According to an embodiment, the present invention is directed to a server, a program executed by the server, and/or a method performed by the server, the server including an interface configured to receive authentication information from an electronic device connected to a charging apparatus; an authentication unit configured to perform authentication with the electronic device based on the authentication information, wherein the interface is configured to transmit permission to initiate charging to the electronic device based on a successful result of the authentication, receive, from the electronic device, information for calculating a tax received from the charging apparatus, and transmit, to the electronic apparatus, a confirmation that the information for calculating the tax has been received.

The authentication information may be generated based on a secret key assigned to the electronic device.

According to an embodiment, the present invention is directed to a system including a first interface, at an electronic device, configured to connect to a charging apparatus and exchange authentication information with a server via a network; a second interface, at the server, configured to receive the authentication information, and transmit permission to initiate charging to the electronic device based on a successful result of the authentication; a control unit, at the electronic device, configured to control charging of a battery of the electronic device based on power received from the charging apparatus and the permission received from the server, wherein the first interface is configured to transmit information for calculating a tax to the server.

The above noted configuration allows for the server to receive tax information related to the charging performed at the electronic device.

BRIEF DESCRIPTION OF THE DRAWINGS

FIG. 1 is an explanatory view showing a system configuration example of a charging system according to an embodiment of the present invention;

FIG. 2 is an explanatory view showing a configuration example of a public key certificate used by an electric vehicle according to the embodiment for authentication processing;

DETAILED DESCRIPTION OF THE EMBODIMENT

Figure 3A:
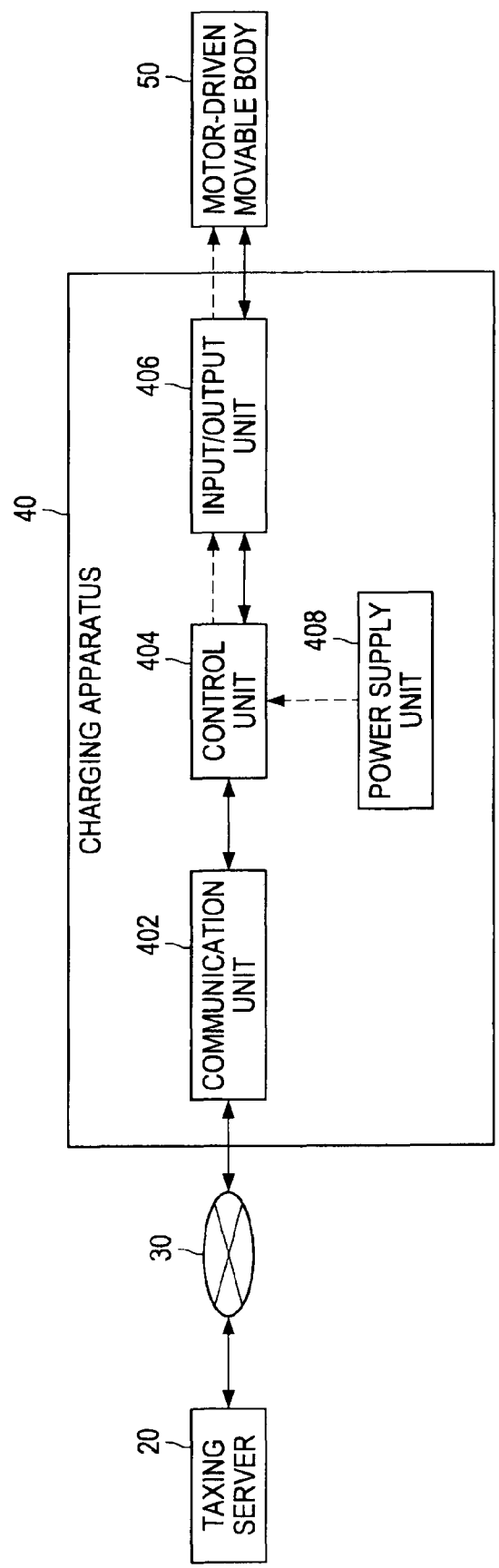
FIG. 3A is an explanatory view showing a function configuration example of a charging apparatus according to the embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of the Description]

The flow of description of embodiments of the present invention described below will briefly be mentioned. First, the system configuration of a charging system according to an embodiment of the present invention will be described with reference to FIG. 1. Next, the configuration of a public key certificate used by an electric vehicle 50 according to the embodiment for authentication processing will be described with reference to FIG. 2. Next, the function configuration of a charging apparatus 40 according to the embodiment will be described with reference to FIG. 3. Next, the function configuration of the electric vehicle 50 according to the embodiment will be described with reference to FIG. 4.

Next, the drive management method of the electric vehicle 50 and the method of managing charging to the electric vehicle 50 according to the embodiment will be described with reference to FIG. 5. Next, the system configuration of the charging system according to a modification of the embodiment will be described with reference to FIGS. 6 and 7. Next, the drive management method of the electric vehicle 50 and the method of managing charging to the electric vehicle 50 according to a modification of the embodiment will be described with reference to FIG. 8. Next, a hardware configuration example that can realize authentication processing and signature generation/signature verification processing according to the embodiment will be described with reference to FIG. 9. Lastly, technical ideas of the embodiment will be summarized and operation effects obtained from the technical ideas will briefly be described.

EXPLANATORY ITEMS

1: Embodiment
   1-1: Overall Configuration of Charging System
      1-1-1: System configuration
      1-1-2: Flow of taxing processing
   1-2: Function Configuration of the Charging Apparatus 40
   1-3: Function Configuration of the Electric vehicle 50
   1-4: Drive Management Method during Charging
2: Modification (Configuration Providing Authentication Function to the Charging Facility)
   2-1: System Configuration
   2-2: Drive Management Method during Charging
3: Hardware Configuration Example
4: Conclusion

1: EMBODIMENT

An embodiment of the present invention will be described below. The present embodiment relates to a mechanism to securely and reliably collect taxes imposed while an electric vehicle is charged. Particularly, the present embodiment relates to a charging system capable of reliably imposing taxes specific to an electric vehicle on the owner of the electric vehicle without providing a dedicated outlet to charge the electric vehicle.

1-1: Overall Configuration of Charging System

First, the overall configuration of a charging system according to the present embodiment will be described with reference to FIG. 1. FIG. 1 is an explanatory view showing a system configuration example of a charging system according to the present embodiment and the flow of taxing processing performed in the charging system during charging. The system configuration of the charging system shown in FIG. 1 is only an example and the system configuration can arbitrarily be modified in a range in which the mechanism of taxing processing according to the present embodiment can be maintained.

The system configuration and the flow of taxing processing will be described below.

1-1-1: System Configuration

As shown in FIG. 1, the charging system is composed of a certificate authority 10, a taxing server 20, the charging apparatus 40, and the electric vehicle 50. The taxing server 20 is connected to the charging apparatus 40 via a network 30.

(The Certificate Authority 10)

The certificate authority 10 is an organization that issues a public key certificate. The certificate authority 10 is controlled, for example, by a state. The certificate authority 10 holds a secret key $sk_0$ and a public key $pk_0$ paired with the secret key $sk_0$. Further, the certificate authority 10 holds a public key certificate $C_0$ generated using the secret key $sk_0$. The public key certificate $C_0$ contains the public key $pk_0$.

(The Taxing Server 20)

The taxing server 20 is means for performing taxing processing on the owner of the electric vehicle 50. The taxing server 20 is controlled, for example, by the National Tax Agency. The taxing server 20 holds a secret key $sk_t$ and a public key $pk_t$ paired with the secret key $sk_t$. Further, the taxing server 20 holds a public key certificate $C_t$ generated by the certificate authority 10 using the secret key $sk_0$. The public key certificate $C_t$ contains the public key $pk_t$.

(The Charging Apparatus 40)

The charging apparatus 40 is means for supplying power to the electric vehicle 50 connected to a plug. The charging apparatus 40 can also transmit information to the taxing server 20 or receive information from the taxing server 20 via the network 30. Further, the charging apparatus 40 can transmit information to the electric vehicle 50 connected to the plug or receive information from the electric vehicle 50 connected to the plug.

(The Electric Vehicle 50)

The electric vehicle 50 has batteries to store power mounted thereon. The electric vehicle 50 also includes a driving mechanism for driving using power stored in batteries. Further, the electric vehicle 50 can transmit information to the taxing server 20 connected to the network 30 via the charging apparatus 40 or receive information from the charging apparatus 40 or the taxing server 20. The electric vehicle 50 may also be configured to directly transmit/receive information to/from the taxing server 20 connected to the network 30 using a radio communication path provided separately.

The electric vehicle 50 holds a secret key $sk_1$ and a public key $pk_1$ paired with the secret key $sk_1$. Further, the electric vehicle 50 holds a public key certificate $C_1$ generated by the certificate authority 10 using the secret key $sk_0$. The public key certificate $C_1$ contains the public key $pk_1$.

1-1-2: Flow of Taxing Processing

In the charging system illustrated in FIG. 1, if the electric vehicle 50 and the charging apparatus 40 are connected by a plug (Step. 1), a communication path is established between the charging apparatus 40 and the taxing server 20 (Step. 2). If a communication path is established between the charging apparatus 40 and the taxing server 20, authentication processing (for example, ISO798-3) is performed between the electric vehicle 50 and the taxing server 20 or the electric vehicle 50 notifies the taxing server 20 of identification $ID_{EV}$ of the electric vehicle 50 (Step. 3).

In Step. 3, a random number $R_t$ is first generated by the taxing server 20 and transmitted to the electric vehicle 50. After receiving the random number $R_t$, the electric vehicle 50 generates a random number $R_1$ to generate a digital signature $S_1$ for a message containing the random numbers $R_1$ and $R_t$ (identification $ID_t$ of the taxing server 20 if necessary) using the secret key $sk_1$ of the electric vehicle 50. Then, the electric vehicle 50 transmits the public key certificate $C_1$, the random number $R_1$, and the digital signature $S_1$ to the taxing server 20.

After receiving the public key certificate $C_1$, the random number $R_t$, and the digital signature $S_1$, the taxing server 20 extracts the public key $pk_0$ from the public key certificate $C_0$ acquired from the certificate authority 10 in advance to verify the public key certificate $C_1$ using the extracted public key $pk_0$. After the verification is successful, the taxing server 20 extracts the public key $pk_1$ from the public key certificate $C_1$ to verify the digital signature $S_1$ using the extracted public key $pk_1$. If the verification is successful, the taxing server 20 authenticates the electric vehicle 50. Then, the taxing server 20 interchanges the order of the random number $R_t$ and the random number $R_1$ to generate a digital signature $S_t$ for a message containing the random numbers $R_1$ and $R_t$ (identification $ID_0$ of the electric vehicle 50 if necessary) using the secret key $sk_t$. Then, the taxing server 20 transmits the public key certificate $C_t$ thereof and the digital signature $S_t$ to the electric vehicle 50.

After receiving the public key certificate $C_t$ and the digital signature $S_t$, the electric vehicle 50 extracts the public key $pk_0$ from the public key certificate $C_0$ acquired from the certificate authority 10 in advance to verify the public key certificate $C_t$ using the extracted public key $pk_0$. After the verification is successful, the electric vehicle 50 extracts the public key $pk_t$ from the public key certificate $C_t$ to verify the digital signature $S_t$ using the extracted public key $pk_t$. If the verification is successful, the electric vehicle 50 authenticates the taxing server 20. If the authentication is successful in both the electric vehicle 50 and the taxing server 20, authentication processing in Step. 3 is completed.

If complex authentication processing like the above one should not be performed, processing in Step. 3 may be changed as described below.

In Step. 3, the electric vehicle 50 first generates a digital signature $S_1'$ for a message containing the identification $ID_{EV}$ thereof using the secret key $sk_1$ thereof and transmits the public key certificate $C_1$ of the electric vehicle 50 and the digital signature $S_1'$ to the taxing server 20.

After receiving the public key certificate $C_1$ and the digital signature $S_1'$, the taxing server 20 extracts the public key $pk_0$ from the public key certificate $C_0$ acquired from the certificate authority 10 in advance to verify the public key certificate $C_1$ using the extracted public key $pk_0$. After the verification is successful, the taxing server 20 extracts the public key $pk_1$ from the public key certificate $C_1$ to verify the digital signature $S_1'$ using the extracted public key $pk_1$. If the verification is successful, the taxing server 20 authenticates the electric vehicle 50 and, with this processing, completes authentication processing in Step. 3.

In this case, if a malicious third-party intercepts the digital signature $S_1'$ exchanged in the past, the third-party can pass authentication processing using this information, but whether an abuse or not can be determined by processing below.

Processing in Step. 3 can further be simplified by changing the processing as described below.

In Step. 3, the public key certificate $C_t$ is first transmitted from the taxing server 20 to the electric vehicle 50. Next, the public key certificate $C_1$ is transmitted from the electric vehicle 50 to the taxing server 20. After receiving the public key certificate $C_t$ from the taxing server 20, the electric vehicle 50 extracts the public key $pk_0$ from the public key certificate $C_0$ acquired from the certificate authority 10 in advance to verify the public key certificate $C_t$ using the extracted public key $pk_0$.

On the other hand, after receiving the public key certificate $C_1$ from the electric vehicle 50, the taxing server 20 extracts the public key $pk_0$ from the public key certificate $C_0$ acquired from the certificate authority 10 in advance to verify the public key certificate $C_1$ using the extracted public key $pk_0$. Successful verification in both the electric vehicle 50 and the taxing server 20 completes authentication processing in Step. 3.

Also in this case, a malicious third-party can pass the authentication processing by acquiring the public key certificate $C_1$ of the electric vehicle 50 by some method but whether an abuse or not can be determined by processing below.

If the authentication processing is successfully completed in Step. 3, the charging apparatus 40 charges batteries of the electric vehicle 50 by supplying power to the electric vehicle 50 (Step. 4). At this point, the electric vehicle 50 disables the driving mechanism (for example, a motor). When charging of the batteries is completed, the electric vehicle 50 and the taxing server 20 start taxing processing (Step. 5). Since authentication is successfully completed in Step. 3, the taxing server 20 already recognizes the owner (ID information (the above identification $ID_{EV}$) of the electric vehicle 50 contained in the public key certificate $C_1$) of the electric vehicle 50 correctly.

In Step. 5, the electric vehicle 50 first transmits information about charged watt-hours to the taxing server 20 (notification of charged watt-hours). After receiving information about charged watt-hours from the electric vehicle 50, the taxing server 20 performs taxing processing based on the charged watt-hours. For example, the taxing server 20 calculates a tax amount in accordance with the charged watt-hours and records the calculated tax amount by associating with the owner of the electric vehicle 50. When such taxing processing is completed, the taxing server 20 transmits information indicating completion of taxing processing to the electric vehicle 50 (notification of taxing completion). After receiving information indicating completion of taxing processing from the taxing server 20, the electric vehicle 50 enables the driving mechanism.

In the foregoing, the system configuration and the flow of taxing processing have been briefly described.

(Modification of the Certificate Authority 10)

In the example of FIG. 1, the certificate authority 10 is controlled from one location. However, if the number of the motor-driven movable bodies 50 increases, the load on the certificate authority 10 also increases. Thus, as shown in FIG. 2, a modification may be made to hierarchically control the certificate authority 10. The modification will briefly be described below. As shown in FIG. 2, the certificate authority 10 has a hierarchical structure including a higher rank certificate authority 12 and lower rank certificate authorities 14 and 16.

The higher rank certificate authority 12 holds the secret key $sk_0$ and the public key $pk_0$ paired with the secret key $sk_0$. Further, the higher rank certificate authority 12 holds the public key certificate $C_0$ generated using the secret key $sk_0$. The lower rank certificate authority 14 holds a secret key $sk_{01}$ and a public key $pk_{01}$ paired with the secret key $sk_{01}$. Further, the lower rank certificate authority 14 holds a public key certificate $C_{01}$ generated by the higher rank certificate authority 12 using the secret key $sk_0$.

The lower rank certificate authority 16 holds a secret key $sk_{02}$ and a public key $pk_{02}$ paired with the secret key $sk_{02}$. Further, the lower rank certificate authority 16 holds a public key certificate $C_{02}$ generated by the higher rank certificate authority 12 using the secret key $sk_0$. The public key certificate $C_0$ contains the public key $pk_0$, the public key certificate $C_{01}$ contains the public key $pk_{01}$, and the public key certificate $C_{02}$ contains the public key $pk_{02}$.

The electric vehicle 50 (EV1) holds the secret key $sk_1$ and the public key $pk_1$ paired with the secret key $sk_1$. Further, the electric vehicle 50 (EV1) holds the public key certificate $C_1$ generated by the lower rank certificate authority 14 using the secret key $sk_{01}$. Similarly, the electric vehicle 50 (EV2) holds a secret key $sk_2$ and a public key $pk_2$ paired with the secret key $sk_2$. Further, the electric vehicle 50 (EV2) holds a public key certificate $C_2$ generated by the lower rank certificate authority 14 using the secret key $sk_{01}$.

The electric vehicle 50 (EV3) holds a secret key $sk_3$ and a public key $pk_3$ paired with the secret key $sk_3$. Further, the electric vehicle 50 (EV3) holds a public key certificate $C_3$ generated by the lower rank certificate authority 16 using the secret key $sk_{02}$. Similarly, the electric vehicle 50 (EV4) holds a secret key $sk_4$ and a public key $pk_4$ paired with the secret key $sk_4$. Further, the electric vehicle 50 (EV4) holds a public key certificate $C_4$ generated by the lower rank certificate authority 16 using the secret key $sk_{02}$.

Thus, if the configuration of the certificate authority 10 is modified to a hierarchical configuration, the authentication processing shown in Step. 3 above (1-1-2: Flow of taxing processing) is modified as shown below. Here, the electric vehicle 50 (EV1) is taken as an example and only the exchange of the public key certificate to be modified will be described.

Public key certificates to be transmitted from the taxing server 20 to the electric vehicle 50 (EV1) in Step. 3 include only the public key certificate $C_t$. Public key certificates to be transmitted from the electric vehicle 50 (EV1) to the taxing server 20 include, in addition to the public key certificate $C_1$, a public key certificate $C_{01}$ acquired in advance by the electric vehicle 50 (EV1) from the lower rank certificate authority 14. After receiving the public key certificate $C_t$ from the taxing server 20, the electric vehicle 50 (EV1) extracts the public key $pk_0$ from the public key certificate $C_0$ acquired in advance from the higher rank certificate authority 12 to verify the public key certificate $C_t$ using the extracted public key $pk_0$.

After receiving the public key certificate $C_{01}$ from the electric vehicle 50 (EV1), on the other hand, the taxing server 20 extracts the public key $pk_0$ from the public key certificate $C_0$ acquired in advance from the higher rank certificate authority 12 to verify the public key certificate $C_{01}$ using the extracted public key $pk_0$. If the verification is successful, the taxing server 20 extracts the public key $pk_{01}$ from the public key certificate $C_{01}$ to verify the public key certificate $C_1$ received from the electric vehicle 50 (EV1) using the extracted public key $pk_{01}$. The processing hereinafter is the same as described above and if authentication is successful in both the electric vehicle 50 (EV1) and the taxing server 20, the authentication in Step. 3 is successful. Authentication processing can similarly be performed for the electric vehicle 50 (EV2), the electric vehicle 50 (EV3), and the electric vehicle 50 (EV4).

In the foregoing, a modification of the configuration of the certificate authority 10 has been described.

A charging system according to the present embodiment performs, as described above, taxing processing by directly exchanging information between the electric vehicle 50 and the taxing server 20. By adopting such a configuration, a mechanism capable of imposing taxes specific to the electric vehicle 50 on the owner of the electric vehicle 50 can be realized without providing a special outlet dedicated to charging the electric vehicle 50. After charging is started, the electric vehicle 50 disables the driving mechanism until the taxing processing is completed. By adopting such a configuration, the owner of the electric vehicle 50 can reliably be taxed.

While the overall system configuration of a charging system according to the present embodiment has been described heretofore, the function configurations of the charging apparatus 40 and the electric vehicle 50 constituting the charging system will be described in more detail below.

1-2: Function Configuration of the Charging Apparatus 40

First, the function configuration of the charging apparatus 40 will be described with reference to FIG. 3A. FIG. 3A is an explanatory view showing a function configuration example of the charging apparatus 40.

As shown in FIG. 3A, the charging apparatus 40 mainly includes a communication unit 402, a control unit 404, an input/output unit 406, and a power supply unit 408.

(Description of the Function)

The communication unit 402 is means for communicating with the taxing server 20 via the network 30. The control unit 404 is means for controlling operations of the communication unit 402, the input/output unit 406, and the power supply unit 408. The input/output unit 406 is means for supplying power to the electric vehicle 50 connected via a plug. The input/output unit 406 also transmits information to the electric vehicle 50 connected via the plug or receives information from the electric vehicle 50 connected via the plug. The power supply unit 408 is a power source (power generation means or batteries) to supply power to the electric vehicle 50 connected via the plug via the input/output unit 406.

(Description of the Operation)

If the electric vehicle 50 is connected to a plug, the input/output unit 406 detects that the electric vehicle 50 has been connected to the plug. Then, the input/output unit 406 notifies the control unit 404 of the connection of the electric vehicle 50. After being notified of the connection of the electric vehicle 50 from the input/output unit 406, the control unit 404 controls the communication unit 402 to establish a communication path to the taxing server 20.

On the other hand, the input/output unit 406 receives a public key certificate (hereinafter, a movable body certificate) transmitted by the electric vehicle 50 and used for authentication processing. Then, the input/output unit 406 inputs the movable body certificate received from the electric vehicle 50 into the control unit 404. The control unit 404 transmits the movable body certificate input by the input/output unit 406 to the taxing server 20 via the communication unit 402.

The communication unit 402 also receives a public key certificate (hereinafter, a server certificate) transmitted by the taxing server 20 and used for authentication. Then, the communication unit 402 inputs the server certificate received from the taxing server 20 into the control unit 404. The control unit 404 transmits the server certificate input by the communication unit 402 to the electric vehicle 50 via the input/output unit 406.

If verification of the movable body certificate by the taxing server 20 is successful and verification of the server certificate by the electric vehicle 50 is successful, the control unit 404 supplies power input from the power supply unit 408 to the electric vehicle 50 via the input/output unit 406. When charging of the electric vehicle 50 is completed, the control unit 404 causes the power supply to the electric vehicle 50 to stop. On the other hand, the input/output unit 406 receives information about charged watt-hours transmitted by the electric vehicle 50. Then, the input/output unit 406 inputs the information about charged watt-hours received from the electric vehicle 50 into the control unit 404. The control unit 404 transmits the information about charged watt-hours input by the input/output unit 406 to the taxing server 20 via the communication unit 402.

When taxing processing by the taxing server 20 is completed, the communication unit 402 receives information indicating completion of taxing processing transmitted by the taxing server 20. Then, the communication unit 402 inputs the information indicating completion of taxing processing received from the taxing server 20 into the control unit 404. The control unit 404 transmits the information indicating completion of taxing processing input by the communication unit 402 to the electric vehicle 50 via the input/output unit 406. If the electric vehicle 50 is removed from the plug, the input/output unit 406 detects that the electric vehicle 50 has been removed from the plug. Then, the input/output unit 406 notifies the control unit 404 of removal of the electric vehicle 50.

In the foregoing, the function and operation of the charging apparatus 40 have been described. Charged watt-hours are managed by the electric vehicle 50 in the above description, but the control unit 404 of the charging apparatus 40 may be configured to manage charged watt-hours. For example, the control unit 404 may be configured such that information about charged watt-hours is recorded and after charging is completed, the taxing server 20 is notified of the recorded information about charged watt-hours. If such a configuration is adopted, the operation will be simplified because there is no need to exchange information about charged watt-hours between the electric vehicle 50 and the charging apparatus 40.

Moreover, authentication processing performed before charging is started may be configured such that, for example, a movable body certificate is transmitted from the electric vehicle 50 to the taxing server 20 before charging is started and, if authentication by the taxing server 20 is successful, charging is started. If such a configuration is adopted, taxing processing can be performed correctly because the owner of the electric vehicle 50 (ID information of the electric vehicle 50) can correctly be checked in the taxing server 20.

(Modified Example: Modification Regarding the Connection Method to a Network)

The charging apparatus 40 shown in FIG. 3A has the communication unit 402 to directly connect to the network 30. However, it is not absolutely necessary for the charging apparatus 40 to be able to connect to the network 30 to realize the function of a charging system according to the present embodiment. For example, as shown in FIG. 3B, the network 30 may be made connectible by using a network communication unit 45 outside the charging apparatus 40.

Figure 3B:
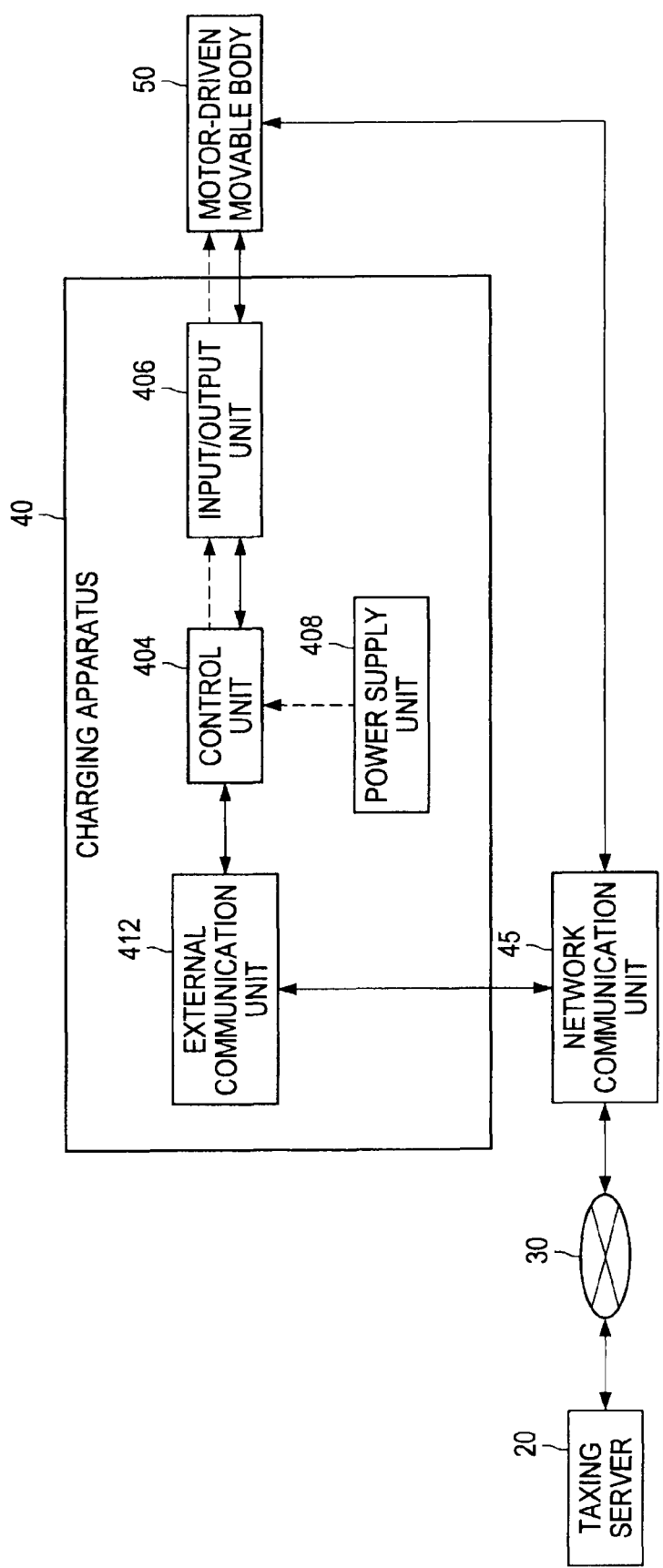
FIG. 3B is an explanatory view showing a function configuration example of the charging apparatus according to a modification of the embodiment.

As a method of using the network communication unit 45, for example, as shown in FIG. 3B, a method of providing an external communication unit 412 to connect to the network communication unit 45 in the charging apparatus 40 is available. If such a configuration is adopted, a connection function to connect to the network 30 can be realized by using the external network communication unit 45 even if an environment in which the charging apparatus 40 can directly be connected to the network 30 is not provided.

Instead of providing the external communication unit 412 in the charging apparatus 40, a method of realizing connection to the network 30 by the network communication unit 45 being directly used by the electric vehicle 50 is also available. In this case, information transmitted by being addressed to the charging apparatus 40 through the network 30 is input into the charging apparatus 40 via the network communication unit 45, the electric vehicle 50, and the input/output unit 406. If there is information to be transmitted from the charging apparatus 40 through the network 30, the information is transmitted via the input/output unit 406, the electric vehicle 50, and the network communication unit 45.

The network communication unit 45 may be any communication means as long as the communication means is outside the charging apparatus 40. As the network communication unit 45, for example, any mobile communication apparatus such as a mobile phone, a mobile information terminal, and a notebook computer can be used. By using such a mobile communication apparatus as communication means, the charging apparatus 40 may be spared the communication function to the network 30.

It is also possible to combine the configuration of the charging apparatus 40 shown in FIG. 3B and that of the charging apparatus 40 shown in FIG. 3A. In this case, the communication function using the network communication unit 45 can be used as backup means when the communication function by the communication unit 402 does not function well (does not connect to the network 30). Thus, the communication means of the charging apparatus 40 can be modified in various ways. Moreover, by combining these various communication means in accordance with the setup environment or utilization form of the charging apparatus 40, a charging system that is more secure and convenient can be realized.

1-3: Function Configuration of the Electric Vehicle 50

Figure 4:
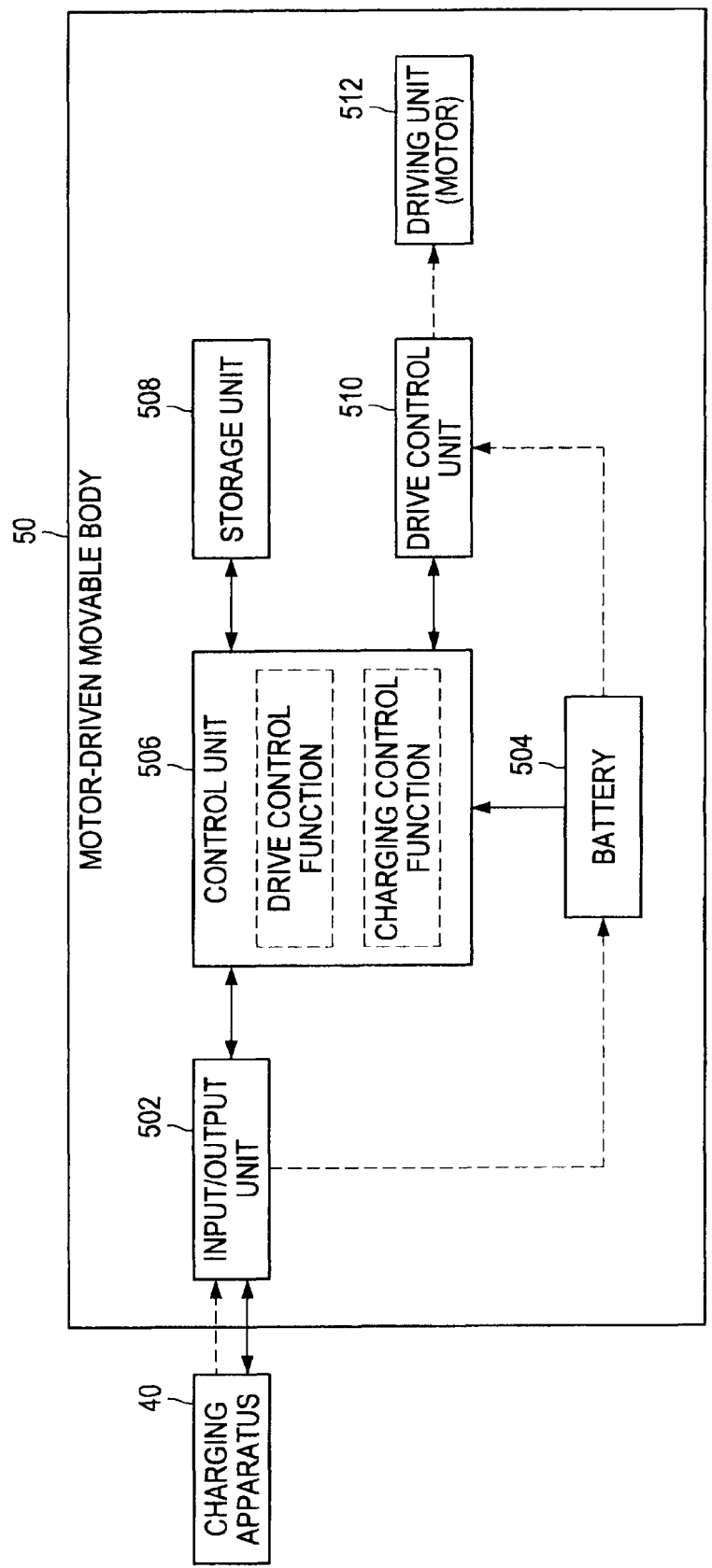
FIG. 4 is an explanatory view showing a function configuration example of an electric vehicle according to the embodiment.

Next, the function configuration of the electric vehicle 50 will be described with reference to FIG. 4. FIG. 4 is an explanatory view showing a function configuration example of the electric vehicle 50.

As shown in FIG. 4, the electric vehicle 50 mainly includes an input/output unit 502, a battery 504, a control unit 506, a storage unit 508, a drive control unit 510, and a driving unit 512.

(Description of the Function)

The input/output unit 502 is means for receiving the supply of power from the charging apparatus 40 while being connected to a plug. The input/output unit 502 transmits information to the charging apparatus 40 or receives information from the charging apparatus 40 while being connected to the plug. The battery 504 is means for storing power supplied from the charging apparatus 40 via the input/output unit 502. The control unit 506 is means for controlling operations of the input/output unit 502, the battery 504, the storage unit 508, and the drive control unit 510. The control unit 506 has a drive management function regarding disabling and enabling of the driving unit 512 and a charging management function regarding permission to charge the battery 504. The storage unit 508 is means for holding information such as secret keys, public keys, and public key certificates. The drive control unit 510 is means for controlling the operation of the driving unit 512. The driving unit 512 is a driving mechanism including a motor of the electric vehicle 50.

(Description of the Operation)

If the electric vehicle 50 is connected to a plug, the input/output unit 502 detects completion of connection of the electric vehicle 50 to the plug. Then, the input/output unit 502 notifies the control unit 506 of the connection completion of the electric vehicle 50. After being notified of the connection completion of the electric vehicle 50 by the input/output unit 502, the control unit 506 reads a public key certificate (movable body certificate) used for authentication processing from the storage unit 508. Then, the control unit 506 transmits the movable body certificate read from the storage unit 508 to the charging apparatus 40 by being addressed to the taxing server 20 via the input/output unit 502.

The input/output unit 502 receives a public key certificate (server certificate) transmitted from the taxing server 20 and used for authentication processing via the charging apparatus 40. Then, the input/output unit 502 inputs the server certificate received via the charging apparatus 40 into the control unit 506. The control unit 506 verifies the server certificate input by the input/output unit 502. If verification of the server certificate is successful and also verification of the movable body certificate by the taxing server 20 is successful, the control unit 506 requests the supply of power to the charging apparatus 40 via the input/output unit 502.

The control unit 506 also disables the driving unit 512 by controlling the drive control unit 510. Further, the control unit 506 enables the input/output unit 502 to charge the battery 504. When power is supplied from the charging apparatus 40, the input/output unit 502 supplies power supplied from the charging apparatus 40 to the battery 504. The control unit 506 monitors the amount of stored charges of the battery 504 and, if the amount of stored charges of the battery 504 reaches a predetermined amount, controls the input/output unit 502 to stop charging of the battery 504. The control unit 506 also transmits information about charged watt-hours to the charging apparatus 40 by being addressed to the taxing server 20 via the input/output unit 502.

After taxing processing by the taxing server 20 is completed, the input/output unit 502 receives information indicating completion of taxing processing transmitted by the taxing server 20 via the charging apparatus 40. Then, the input/output unit 502 inputs the information indicating completion of taxing processing received from the taxing server 20 via the charging apparatus 40 into the control unit 506. After the information indicating completion of taxing processing being input by the input/output unit 502, the control unit 506 controls the drive control unit 510 to enable the driving unit 512. Then, the electric vehicle 50 is removed from the plug to become actually drivable.

In the foregoing, the function and operation of the electric vehicle 50 have been described. Charged watt-hours are managed by the control unit 506 in the above description, but the charging apparatus 40 may be configured to manage charged watt-hours. If such a configuration is adopted, the operation will be simplified because there is no need to exchange information about charged watt-hours between the electric vehicle 50 and the charging apparatus 40.

Moreover, authentication processing performed before charging is started may be configured such that, for example, a movable body certificate is transmitted from the electric vehicle 50 to the taxing server 20 before charging is started and, if authentication by the taxing server 20 is successful, charging is started. If such a configuration is adopted, taxing processing can be performed correctly because the owner of the electric vehicle 50 (ID information of the electric vehicle 50) can correctly be checked in the taxing server 20.

1-4: Drive Management Method During Charging

Next, the drive management method during charging according to the present embodiment will be described in more detail with reference to FIG. 5. FIG. 5 is an explanatory view showing the flow of a sequence of processing related to the drive management method during charging according to the present embodiment. In the description heretofore, details of the exchange of information about taxing processing performed between the electric vehicle 50 and the taxing server 20 have been omitted. Thus, the exchange of information about taxing processing performed between the electric vehicle 50 and the taxing server 20 will be described below in more detail.

Figure 5:
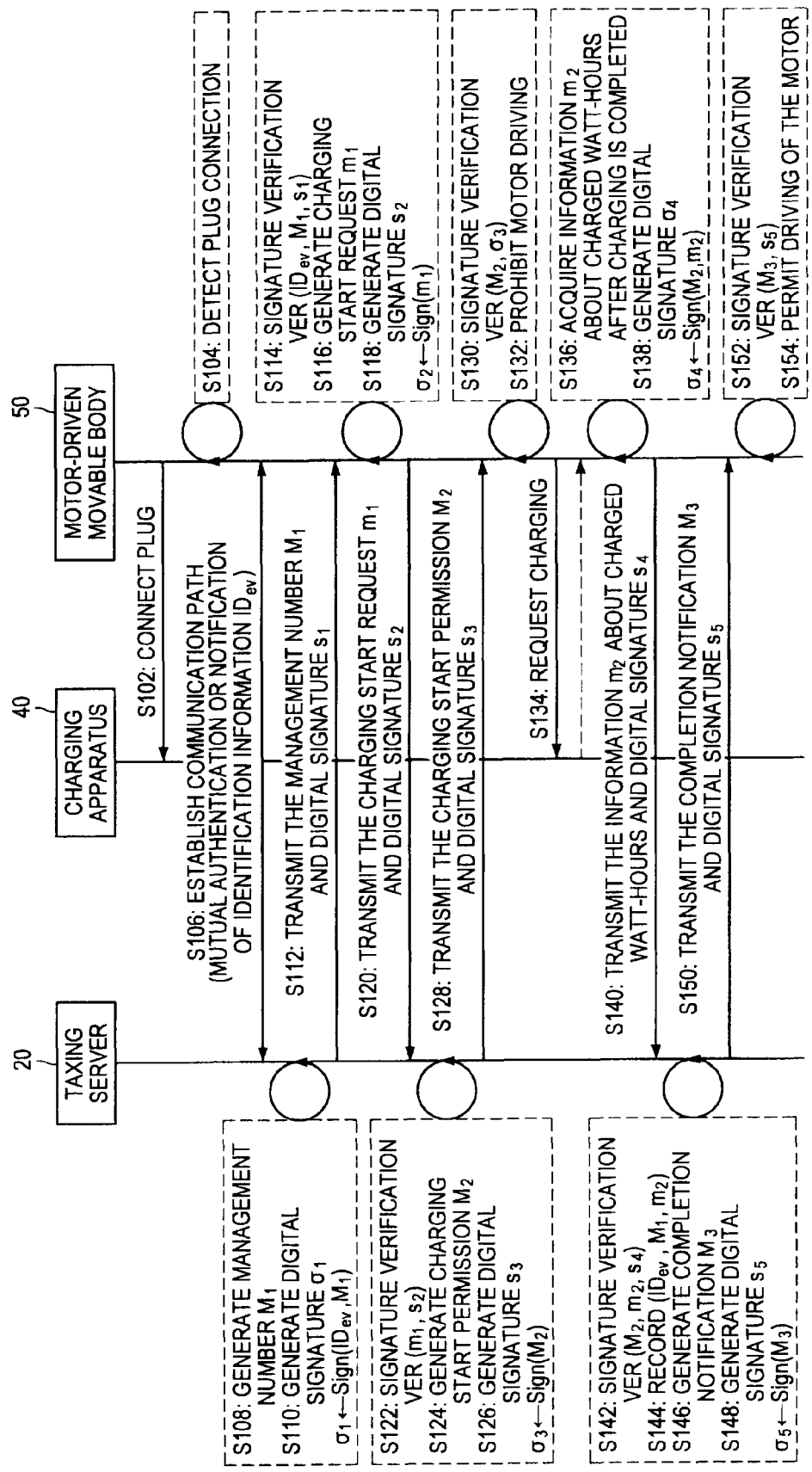
FIG. 5 is an explanatory view exemplifying a drive management method of the electric vehicle and a method of managing charging to the electric vehicle according to the embodiment.

As shown in FIG. 5, the electric vehicle 50 is first connected to the plug of the charging apparatus 40 (S102). Next, the electric vehicle 50 detects completion of connection to the plug (S104). Next, the electric vehicle 50 establishes a communication path to the taxing server 20 via the charging apparatus 40 (S106). At this point, the electric vehicle 50 notifies the taxing server 20 of identification information $ID_{ev}$ of the electric vehicle 50. The identification information $ID_{ev}$ is ID information specific to each of the motor-driven movable bodies 50. Thus, the taxing server 20 can identify the owner (taxable target) of the electric vehicle 50 based on the identification information $ID_{ev}$.

The identification information $ID_{ev}$ is transmitted, for example, by including a movable body certificate. The identification information $ID_{ev}$ may also be transmitted in a message containing the identification information $ID_{ev}$ after a digital signature being attached to the message or by performing processing according to a predetermined mutual authentication protocol.

If the communication path is established between the electric vehicle 50 and the taxing server 20 by the processing in step S106, the taxing server 20 generates a management number $M_1$ (S108). The management number $M_1$ is a number used to manage information such as charged watt-hours and the tax amount notified from each of the motor-driven movable bodies 50 each time during charging. The management number $M_1$ is randomly selected or sequentially assigned to avoid overlapping.

Next, the taxing server 20 generates a digital signature $\sigma_1$ based on the identification information $ID_{ev}$ and the management number $M_1$ (S110). For example, the taxing server 20 generates the digital signature $\sigma_1$ by inputting the identification information $ID_{ev}$ and the management number $M_1$ into a signature generation algorithm Sig using the secret key $sk_t$ of the taxing server 20.

Next, the taxing server 20 transmits the management number $M_1$ and the digital signature $\sigma_1$ to the electric vehicle 50 (S112). After receiving the management number $M_1$ and the digital signature $\sigma_1$ from the taxing server 20, the electric vehicle 50 verifies validity of the management number $M_1$ using the identification information ID, the management number $M_1$, and the digital signature $\sigma_1$ held by the electric vehicle 50 (S114). For example, the electric vehicle 50 verifies the signature by inputting the identification information $ID_{ev}$, the management number $M_1$, and the digital signature $\sigma_1$ into a signature verification algorithm Ver using the public key $pk_t$ of the taxing server 20.

If the identification information $ID_{ev}$, the management number $M_1$, and the digital signature $\sigma_1$ are accepted, the electric vehicle 50 generates a charging start request $m_1$ to receive permission to start charging from the taxing server 20 (S116). The charging start request $m_1$ is, for example, an electronic document containing the management number $M_1$ received from the taxing server 20 and the identification information $ID_{ev}$ of the electric vehicle 50.

Next, the electric vehicle 50 generates a digital signature $\sigma_2$ based on the charging start request $m_1$ (S118). For example, the electric vehicle 50 generates the digital signature $\sigma_2$ by inputting the charging start request $m_1$ into the signature generation algorithm Sig using the secret key $sk_1$ of the electric vehicle 50. Next, the electric vehicle 50 transmits the charging start request $m_1$ and the digital signature $\sigma_2$ to the taxing server 20 (S120).

After receiving the charging start request $m_1$ and the digital signature $\sigma_2$ from the electric vehicle 50, the taxing server 20 verifies validity of the charging start request $m_1$ using the digital signature $\sigma_2$ (S122). For example, the taxing server 20 verifies the signature by inputting the charging start request $m_1$ and the digital signature $\sigma_2$ into the signature verification algorithm Ver using the public key $pk_1$ of the electric vehicle 50.

If the charging start request $m_1$ and the digital signature $\sigma_2$ are accepted, the taxing server 20 generates charging start permission $M_2$ to enable the start of charging (S124). The charging start permission $M_2$ is, for example, an electronic document containing the charging start request $m_1$ received from the electric vehicle 50. Next, the taxing server 20 generates a digital signature $\sigma_3$ based on the charging start permission $M_2$ (S126). For example, the taxing server 20 generates the digital signature $\sigma_3$ by inputting the charging start permission $M_2$ into the signature generation algorithm Sig using the secret key $sk_t$ of the taxing server 20. Next, the taxing server 20 transmits the charging start permission $M_2$ and the digital signature $\sigma_3$ to the electric vehicle 50 (S128).

After receiving the charging start permission. $M_2$ and the digital signature $\sigma_3$ from the taxing server 20, the electric vehicle 50 verifies validity of the charging start permission $M_2$ using the digital signature $\sigma_3$ (S130). For example, the electric vehicle 50 verifies the signature by inputting the charging start permission $M_2$ and the digital signature $\sigma_3$ into the signature verification algorithm Ver using the public key $pk_t$ of the taxing server 20. If the charging start permission $M_2$ and the digital signature $\sigma_3$ are accepted, the electric vehicle 50 disables driving of the motor (the driving unit 512) (S132). Next, the electric vehicle 50 transmits a charging request to cause the charging apparatus 40 to start the supply of power (S134). If the charging request is received by the charging apparatus 40, power is supplied from the charging apparatus 40 to the electric vehicle 50.

When charging is completed, the electric vehicle 50 acquires information $m_2$ about charged watt-hours (S136). For example, the electric vehicle 50 monitors the amount of stored charges of the battery 504 to calculate charged watt-hours from a difference in the amount of stored charges before and after charging. Alternatively, the electric vehicle 50 makes an inquiry about charged watt-hours at the charging apparatus 40 to acquire the information $m_2$ about charged watt-hours from the charging apparatus 40. Next, the electric vehicle 50 generates a digital signature $\sigma_4$ based on the charging start permission $M_2$ and the information $m_2$ about charged watt-hours (S138). For example, the electric vehicle 50 generates the digital signature $\sigma_4$ by inputting the charging start permission $M_2$ and the information $m_2$ about charged watt-hours into the signature generation algorithm Sig using the secret key $sk_1$ of the electric vehicle 50. Next, the electric vehicle 50 transmits the information $m_2$ about charged watt-hours and the digital signature $\sigma_4$ to the taxing server 20 (S140).

After receiving the information $m_2$ about charged watt-hours and the digital signature $\sigma_4$ from the electric vehicle 50, the taxing server 20 verifies validity of the information $m_2$ about charged watt-hours using the digital signature $\sigma_4$ (S142). For example, the taxing server 20 verifies the signature by inputting the charging start permission $M_2$, the information $m_2$ about charged watt-hours, and the digital signature $\sigma_4$ held by the taxing server 20 into the signature verification algorithm Ver using the public key $pk_1$ of the electric vehicle 50. If the charging start permission $M_2$, the information $m_2$ about charged watt-hours, and the digital signature $\sigma_4$ are accepted, the taxing server 20 associates and records the identification information $ID_{ev}$, the management number $M_1$, and the information $m_2$ about charged watt-hours (S144).

Next, the taxing server 20 generates a completion notification $M_3$ indicating completion of taxing processing (S146). The completion notification $M_3$ is, for example, an electronic document containing the information $m_2$ about charged watt-hours. Next, the taxing server 20 generates a digital signature $\sigma_5$ based on the completion notification $M_3$ (S148). For example, the taxing server 20 generates the digital signature $\sigma_5$ by inputting the completion notification $M_3$ into the signature generation algorithm Sig using the secret key $sk_t$ of the taxing server 20. Next, the taxing server 20 transmits the completion notification $M_3$ and the digital signature $\sigma_5$ to the electric vehicle 50 (S150).

After receiving the completion notification $M_3$ and the digital signature $\sigma_5$ from the taxing server 20, the electric vehicle 50 verifies validity of the completion notification $M_3$ using the digital signature $\sigma_5$ (S152). For example, the electric vehicle 50 verifies the signature by inputting the completion notification $M_3$ and the digital signature $\sigma_5$ into the signature verification algorithm Ver using the public key $pk_t$ of the taxing server 20. If the completion notification $M_3$ and the digital signature $\sigma_5$ are accepted, the electric vehicle 50 enables driving of the motor (the driving unit 512) (S154).

Thus, the electric vehicle 50 exchanges information used for taxation with the taxing server 20 using public key signatures. The electric vehicle 50 disables the motor before starting charging and, after taxing processing is completed, enables the motor. Therefore, when charged, it is difficult for the user of the electric vehicle 50 to drive the electric vehicle 50 before taxing processing is completed. As a result, an act to illegally evade taxing processing can be deterred.

The configurations of electronic documents and digital signatures transmitted in steps S120, S128, S140, and S150 described above can be changed within a range in which security is adequately secured if necessary. For example, the charging start request $m_1$ may contain, in addition to the identification information $ID_{ev}$ and the management number $M_1$, the digital signature $\sigma_1$. The charging start permission $M_2$ may contain the digital signature $\sigma_2$.

Further, the digital signature $\sigma_4$ may be generated based on the information $m_2$ about charged watt-hours, the charging start permission $M_2$, and the digital signature $\sigma_3$. Then, the completion notification $M_3$ may contain, in addition to the information $m_2$ about charged watt-hours, the charging start permission $M_2$ and the digital signature $\sigma_4$. Moreover, an index number to identify each electronic document may be contained in electronic documents transmitted in steps S112, S120, S128, S140, and S150. Further, data that changes with time such as a time stamp may be included in a message to prevent reuse of a telegraphic message used in the past.

In the foregoing, the drive management method during charging according to the present embodiment has been described. Moreover, processing of the exchange of information carried out in taxing processing according to the present embodiment has been described in detail. By adopting such configurations, taxes specific to an electric vehicle can reliably be collected without providing an outlet dedicated to charging the electric vehicle. As a result, extra burdens of cost for collecting taxes from the electric vehicle can be suppressed, contributing to widespread use of motor-driven movable bodies.

(Supplemental Remarks)

Incidentally, the expiration date of a public key certificate used for the above authentication processing is preferably set for a legal maintenance date of the electric vehicle 50. If, for example, the electric vehicle 50 is an electric vehicle, the legal maintenance date means the vehicle inspection date of the electric vehicle. However, the expiration date of a public key certificate does not have to perfectly match the legal maintenance date and, for example, a postponement for update may be asked for such as granting a month's postponement or the expiration date may be set prior to the legal maintenance date to warn of the approaching vehicle inspection date when the vehicle is used. Therefore, the expiration date may be set prior to or subsequent to the legal maintenance date by a predetermined number of days or time.

The issuance of public key certificates and provision thereof to the electric vehicle 50 can be implemented through a network. However, in view of burdens necessary for managing issuing dates and countermeasures against illegal issuance of public key certificates, it is preferable to adopt a mechanism by which a public key certificate is reissued during vehicle inspection. That is, by adopting a mechanism by which a public key certificate is issued during vehicle inspection under the control of the District Land Transport Bureau, the issuance of public key certificates can be made easier and also risks involved in falsification or wiretapping of public key certificates can be reduced.

In the above description, the electric vehicle 50 has been taken as an example. This is because an effect of being disabled until taxing processing is completed is considered to be easily understood. However, the above mechanism of taxing processing is also applicable to power utilization by household electrical appliances and charging of home batteries. The present system of taxation is not a system in which the tax amount is different depending on the type of motor-driven equipment. However, in the future when relaxation measures of tax rates for energy-saving home appliances are taken, a taxation system with less tax collection omissions can be realized at low cost by adopting a mechanism according to the present embodiment.

2: MODIFICATION

Configuration Providing Authentication Function to the Charging Apparatus

Next, a modification of the present embodiment will be described.

In the charging system described above, public key authentication and signature processing are performed between the electric vehicle 50 and the taxing server 20. If such a system configuration is adopted, there is no need to store public key certificates in the charging apparatus 40, which makes management of public key certificates and installation of the charging apparatus 40 easier. However, it is technically possible to cause the charging apparatus 40 to hold public key certificates.

Figure 6:
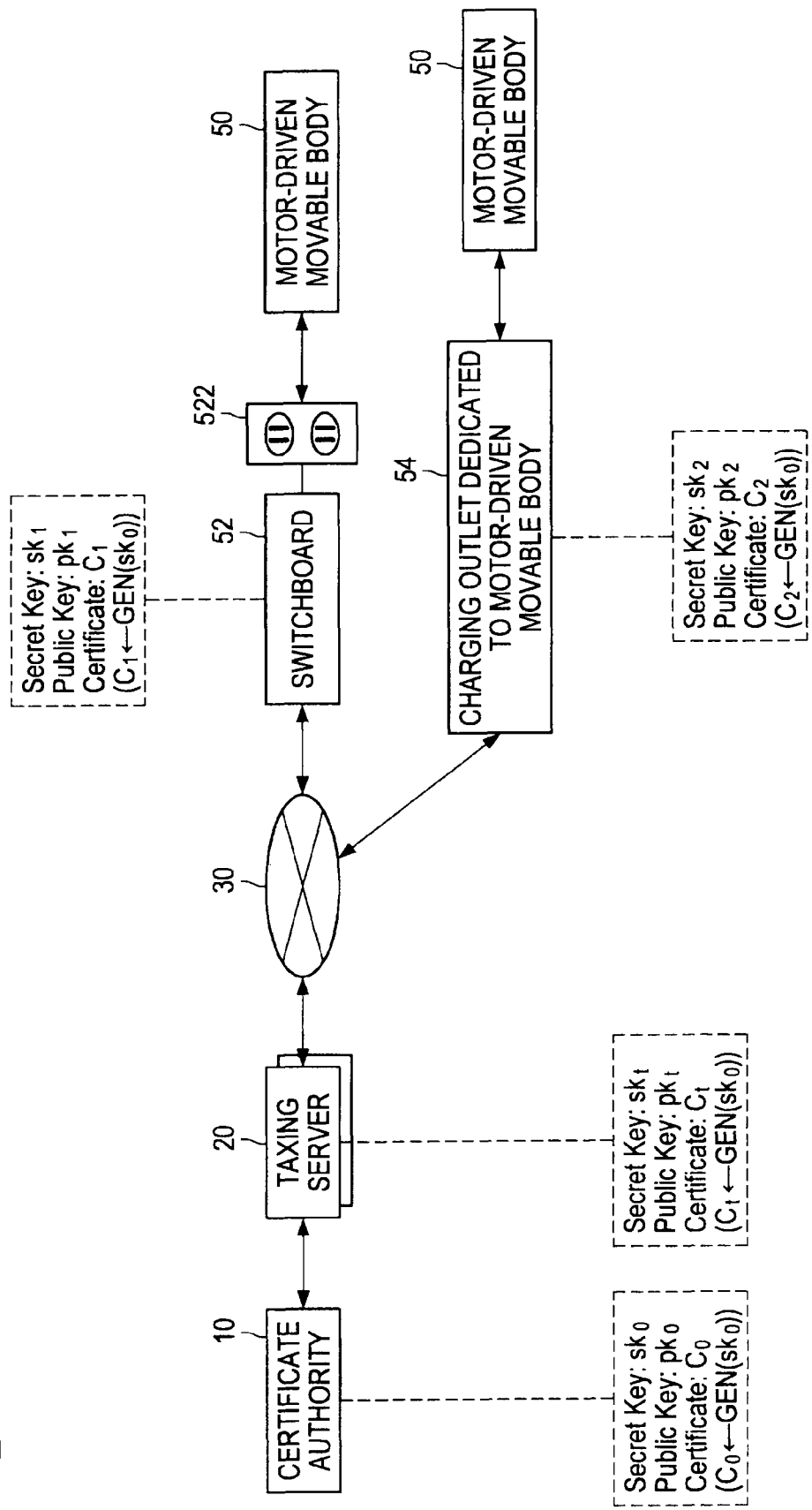
FIG. 6 is an explanatory view showing a system configuration example of the charging system according to a modification of the embodiment.

For example, as shown in FIG. 6, it is possible to separately issue a public key certificate for a switchboard 52 in ordinary households or a charging outlet 54 dedicated to motor-driven movable bodies independent of the switchboard 52. The charging outlet 54 dedicated to motor-driven movable bodies means, for example, charging facilities that are installed in a parking lot or the like and receive power supply from substation facilities independent of the switchboard 52. It is needless to say that the installation location and power supply source of the charging outlet 54 dedicated to motor-driven movable bodies can be changed in accordance with the usage pattern or installation environment when necessary.

The present modification relates to a system configuration example that separately issues a public key certificate for the switchboard 52 or the charging outlet 54 dedicated to motor-driven movable bodies corresponding to the charging apparatus 40.

2-1: System Configuration

The system configuration of a charging system according to the present modification is basically the same as that in FIG. 1, but the charging apparatus 40 in FIG. 1 is changed to the switchboard 52 and the charging outlet 54 dedicated to motor-driven movable bodies (see FIG. 6). Moreover, the mechanism of charging is changed so that the electric vehicle 50 is connected to an outlet 522 connected to the switchboard 52 or the charging outlet 54 dedicated to motor-driven movable bodies for charging.

Figure 7:
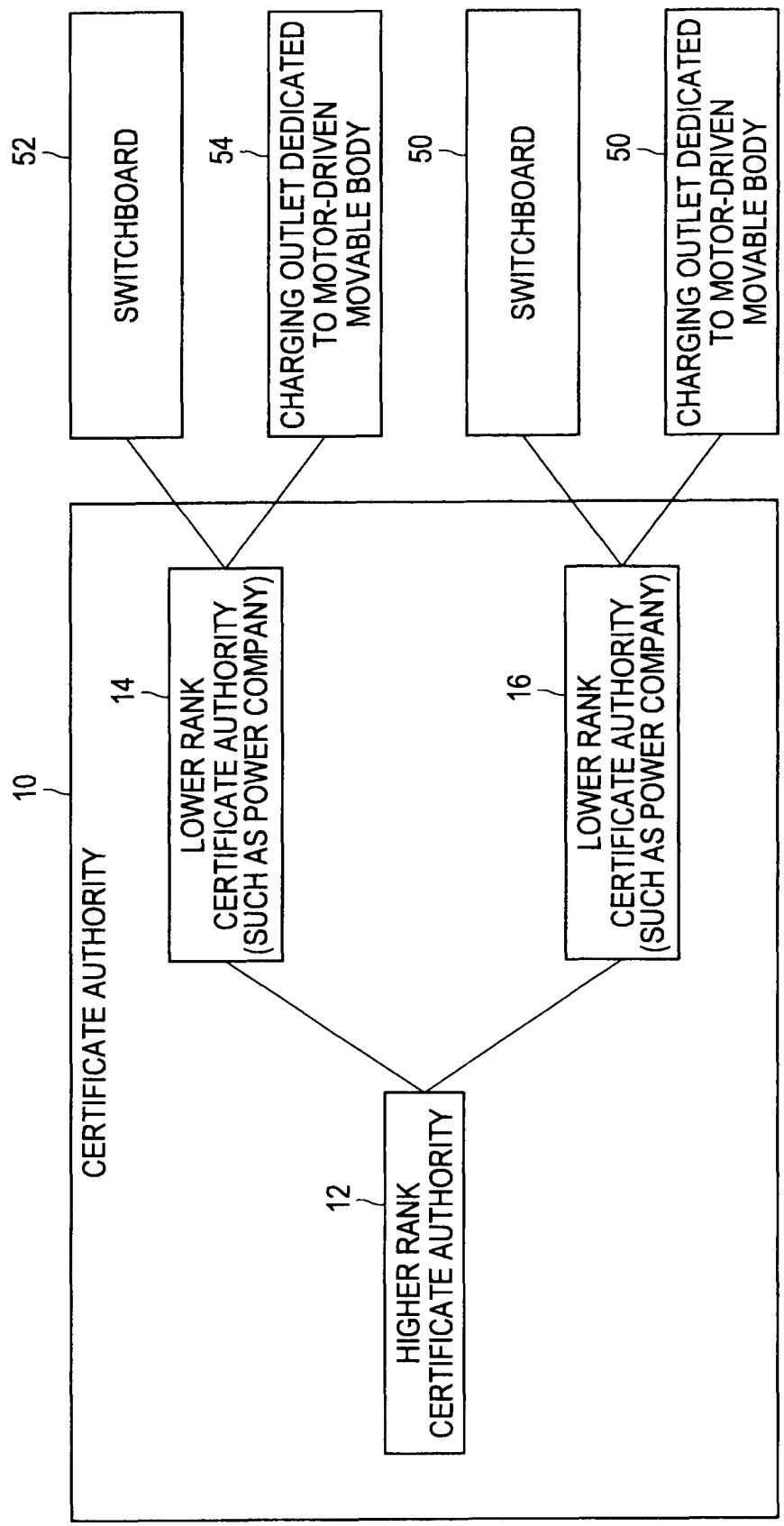
FIG. 7 is an explanatory view showing a system configuration example of the charging system according to a modification of the embodiment.

Then, as shown in FIG. 7, administrators of lower rank certificate authorities 15 and 17 are changed to power companies or the like. An advantage of adopting such a system configuration is to be able to recognize charging facilities from the side of the taxing server 20. For example, a public key certificate is issued to the switchboard 52 or the charging outlet 54 dedicated to motor-driven movable bodies via a contract power company. There is normally more than one outlet 522 for each of the switchboards 52 and therefore, a public key certificate may be issued for each of the outlets 522 though waste is thereby increased in terms of cost.

That is, the contract power company manages power facilities (the switchboard 52 or the charging outlet 54 dedicated to motor-driven movable bodies) of the user. In this case, ID information specific to each of the switchboard 52 and the charging outlet 54 dedicated to motor-driven movable bodies is assigned. Thus, the taxing server 20 can identify each of the switchboard 52 and the charging outlet 54 dedicated to motor-driven movable bodies. Taxation is imposed on the contractor of each of the switchboard 52 and the charging outlet 54 dedicated to motor-driven movable bodies. That is, taxing processing is performed on ID information specific to each of the switchboard 52 and the charging outlet 54 dedicated to motor-driven movable bodies. Tax collection is executed by the contract power company or the like. A case where the drive management method during charging described above is applied to the system configuration according to the present modification will be described below.

2-2: Drive Management Method during Charging

Figure 8:
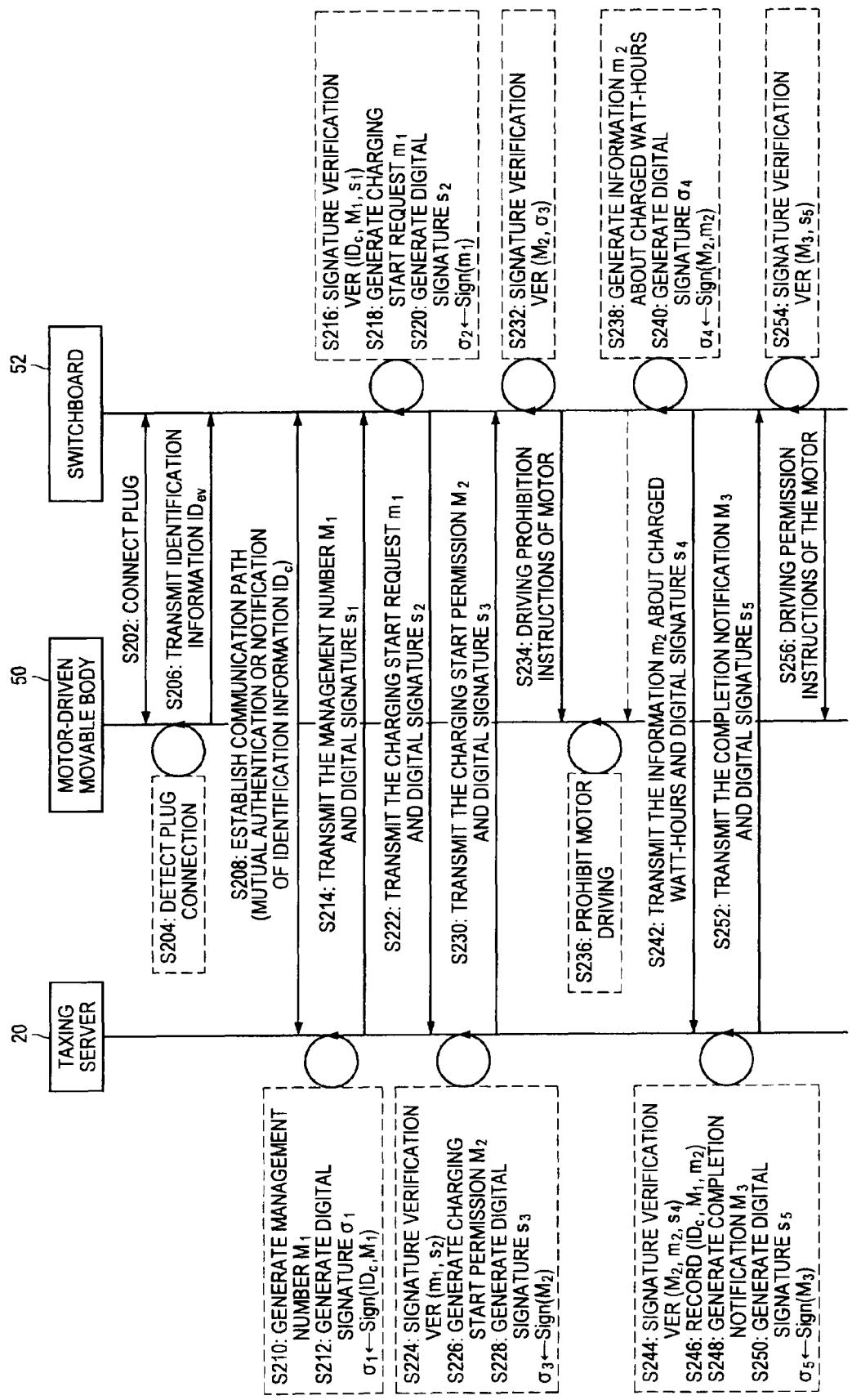
FIG. 8 is an explanatory view exemplifying the drive management method of the electric vehicle and the method of managing charging to the electric vehicle according to a modification of the embodiment.

The drive management method during charging according to the present modification will be described with reference to FIG. 8. FIG. 8 is an explanatory view showing the flow of a sequence of processing related to the drive management method during charging according to the present modification. Here, as an example, taxing processing performed between the switchboard 52 to which the electric vehicle 50 is connected and the taxing server 20 will be described. If processing by the switchboard 52 is replaced by that of the charging outlet 54 dedicated to motor-driven movable bodies, the flow of taxing processing performed between the charging outlet 54 dedicated to motor-driven movable bodies and the taxing server 20 will be obtained.

As shown in FIG. 8, the electric vehicle 50 is first connected to the outlet 522 of the switchboard 52 (S202). Next, the electric vehicle 50 detects completion of connection to the outlet 522 (S204). Next, the electric vehicle 50 transmits authentication information $ID_{ev}$ to the switchboard 52 (S206). The switchboard 52 holds the authentication information $ID_{ev}$ received from the electric vehicle 50. Thus, by holding the authentication information $ID_{ev}$ of the electric vehicle 50 in this manner, it becomes possible to identify the owner of the electric vehicle 50.

Next, the switchboard 52 establishes a communication path to the taxing server 20 (S208). At this point, the switchboard 52 notifies the taxing server 20 of identification information $ID_c$ of the switchboard 52. The identification information $ID_c$ is ID information specific to each of the switchboards 52. Thus, the taxing server 20 can identify the contractor (taxable target) of the switchboard 52 based on the identification information $ID_c$. The identification information ID, is transmitted, for example, by being included in a public key certificate issued for the switchboard 52. The identification information $ID_c$ may also be transmitted in a message containing the identification information $ID_c$ after a digital signature being attached to the message or by performing processing according to a predetermined mutual authentication protocol.

If the communication path is established between the switchboard 52 and the taxing server 20 by the processing in step S208, the taxing server 20 generates a management number $M_1$ (S210). The management number $M_1$ is a number used to manage information such as charged watt-hours and the tax amount notified from each of the switchboards 52 each time during charging. The management number $M_1$ is randomly selected or sequentially assigned to avoid overlapping. Next, the taxing server 20 generates a digital signature $\sigma_1$ based on the identification information $ID_c$ and the management number $M_1$ (S212). For example, the taxing server 20 generates the digital signature $\sigma_1$ by inputting the identification information $ID_c$ and the management number $M_1$ into the signature generation algorithm Sig using the secret key $sk_t$ of the taxing server 20.

Next, the taxing server 20 transmits the management number $M_1$ and the digital signature $\sigma_1$ to the switchboard 52 (S214). After receiving the management number $M_1$ and the digital signature $\sigma_1$ from the taxing server 20, the switchboard 52 verifies validity of the management number $M_1$ using the identification information $ID_c$, the management number $M_1$, and the digital signature $\sigma_1$ held by the switchboard 52 (S216). For example, the switchboard 52 verifies the signature by inputting the identification information $ID_c$, the management number $M_1$, and the digital signature $\sigma_1$ into the signature verification algorithm Ver using the public key $pk_t$ of the taxing server 20. If the identification information $ID_c$, the management number $M_1$, and the digital signature $\sigma_1$ are accepted, the switchboard 52 generates a charging start request $m_1$ to receive permission to start charging from the taxing server 20 (S218). The charging start request $m_1$ is, for example, an electronic document containing the management number $M_1$ received from the taxing server 20 and the identification information $ID_c$ of the switchboard 52.

Next, the switchboard 52 generates a digital signature $\sigma_2$ based on the charging start request $m_1$ (S220). For example, the switchboard 52 generates the digital signature $\sigma_2$ by inputting the charging start request $m_1$ into the signature generation algorithm Sig using the secret key $sk_t$ of the switchboard 52. Next, the switchboard 52 transmits the charging start request $m_1$ and the digital signature $\sigma_2$ to the taxing server 20 (S222). After receiving the charging start request $m_1$ and the digital signature $\sigma_2$ from the switchboard 52, the taxing server 20 verifies validity of the charging start request $m_1$ using the digital signature $\sigma_2$ (S224). For example, the taxing server 20 verifies the signature by inputting the charging start request $m_1$ and the digital signature $\sigma_2$ into the signature verification algorithm Ver using the public key $pk_1$ of the switchboard 52.

If the charging start request $m_1$ and the digital signature $\sigma_2$ are accepted, the taxing server 20 generates charging start permission $M_2$ to enable the start of charging (S226). The charging start permission $M_2$ is, for example, an electronic document containing the charging start request $m_1$ received from the switchboard 52. Next, the taxing server 20 generates a digital signature $\sigma_3$ based on the charging start permission $M_2$ (S228). For example, the taxing server 20 generates the digital signature $\sigma_3$ by inputting the charging start permission $M_2$ into the signature generation algorithm Sig using the secret key $sk_t$ of the taxing server 20. Next, the taxing server 20 transmits the charging start permission $M_2$ and the digital signature $\sigma_3$ to the switchboard 52 (S230).

After receiving the charging start permission $M_2$ and the digital signature $\sigma_3$ from the taxing server 20, the switchboard 52 verifies validity of the charging start permission $M_2$ using the digital signature $\sigma_3$ (S232). For example, the switchboard 52 verifies the signature by inputting the charging start permission $M_2$ and the digital signature $\sigma_3$ into the signature verification algorithm Ver using the public key $pk_t$ of the taxing server 20. If the charging start permission $M_2$ and the digital signature $\sigma_3$ are accepted, the switchboard 52 transmits a driving disable instruction to disable driving of the motor to the electric vehicle 50 (S234). After receiving the driving disable instruction, the electric vehicle 50 disables driving of the motor (S236). After driving of the motor is disabled, the switchboard 52 supplies power to the electric vehicle 50.

When charging is completed, the switchboard 52 generates information $m_2$ about charged watt-hours (S238). Next, the switchboard 52 generates a digital signature $\sigma_4$ based on the charging start permission $M_2$ and the information $m_2$ about charged watt-hours (S240). For example, the switchboard 52 generates the digital signature $\sigma_4$ by inputting the charging start permission $M_2$ and the information $m_2$ about charged watt-hours into the signature generation algorithm Sig using the secret key $sk_1$ of the switchboard 52. Next, the switchboard 52 transmits the information $m_2$ about charged watt-hours and the digital signature $\sigma_4$ to the taxing server 20 (S242). Incidentally, the information $m_2$ about charged watt-hours may be generated by the control unit 506 of the electric vehicle 50 before being transmitted to the switchboard 52 via the input/output unit 502.

After receiving the information $m_2$ about charged watt-hours and the digital signature $\sigma_4$ from the switchboard 52, the taxing server 20 verifies validity of the information $m_2$ about charged watt-hours using the digital signature $\sigma_4$ (S244). For example, the taxing server 20 verifies the signature by inputting the charging start permission $M_2$, the information $m_2$ about charged watt-hours, and the digital signature $\sigma_4$ held by the taxing server 20 into the signature verification algorithm Ver using the public key $pk_1$ of the switchboard 52. If the charging start permission $M_2$, the information $m_2$ about charged watt-hours, and the digital signature $\sigma_4$ are accepted, the taxing server 20 associates and records the identification information $ID_c$, the management number $M_1$, and the information $m_2$ about charged watt-hours (S246).

Next, the taxing server 20 generates a completion notification $M_3$ indicating completion of taxing processing (S248). The completion notification $M_3$ is, for example, an electronic document containing the information $m_2$ about charged watt-hours. Next, the taxing server 20 generates a digital signature $\sigma_5$ based on the completion notification $M_3$ (S250). For example, the taxing server 20 generates the digital signature $\sigma_5$ by inputting the completion notification $M_3$ into the signature generation algorithm Sig using the secret key $sk_t$ of the taxing server 20. Next, the taxing server 20 transmits the completion notification $M_3$ and the digital signature $\sigma_5$ to the switchboard 52 (S252).

After receiving the completion notification $M_3$ and the digital signature $\sigma_5$ from the taxing server 20, the switchboard 52 verifies validity of the completion notification $M_3$ using the digital signature $\sigma_5$ (S254). For example, the switchboard 52 verifies the signature by inputting the completion notification $M_3$ and the digital signature $\sigma_5$ into the signature verification algorithm Ver using the public key $pk_t$ of the taxing server 20. If the completion notification $M_3$ and the digital signature $\sigma_5$ are accepted, the switchboard 52 transmits a driving enable instruction to enable driving of the motor to the electric vehicle 50 (S256).

If the switchboard 52 is replaced by the charging outlet 54 dedicated to motor-driven movable bodies installed in a charging station or the like, for example, a modification may be made in such a way that a step to collect the electric cost and tax amount from the user is inserted prior to step S256 described above and only after the collection is completed, the processing proceeds to processing in step S256.

In this manner, the switchboard 52 exchanges information used for taxation with the taxing server 20 using public key signatures. The switchboard 52 disables driving of the electric vehicle 50 before starting charging and enables driving after taxing processing is completed. Thus, the user of the electric vehicle 50 is disabled from driving the electric vehicle 50 during charging until taxing processing is completed. As a result, an act to illegally evade taxing processing can be deterred.

3: HARDWARE CONFIGURATION EXAMPLE

Figure 9:
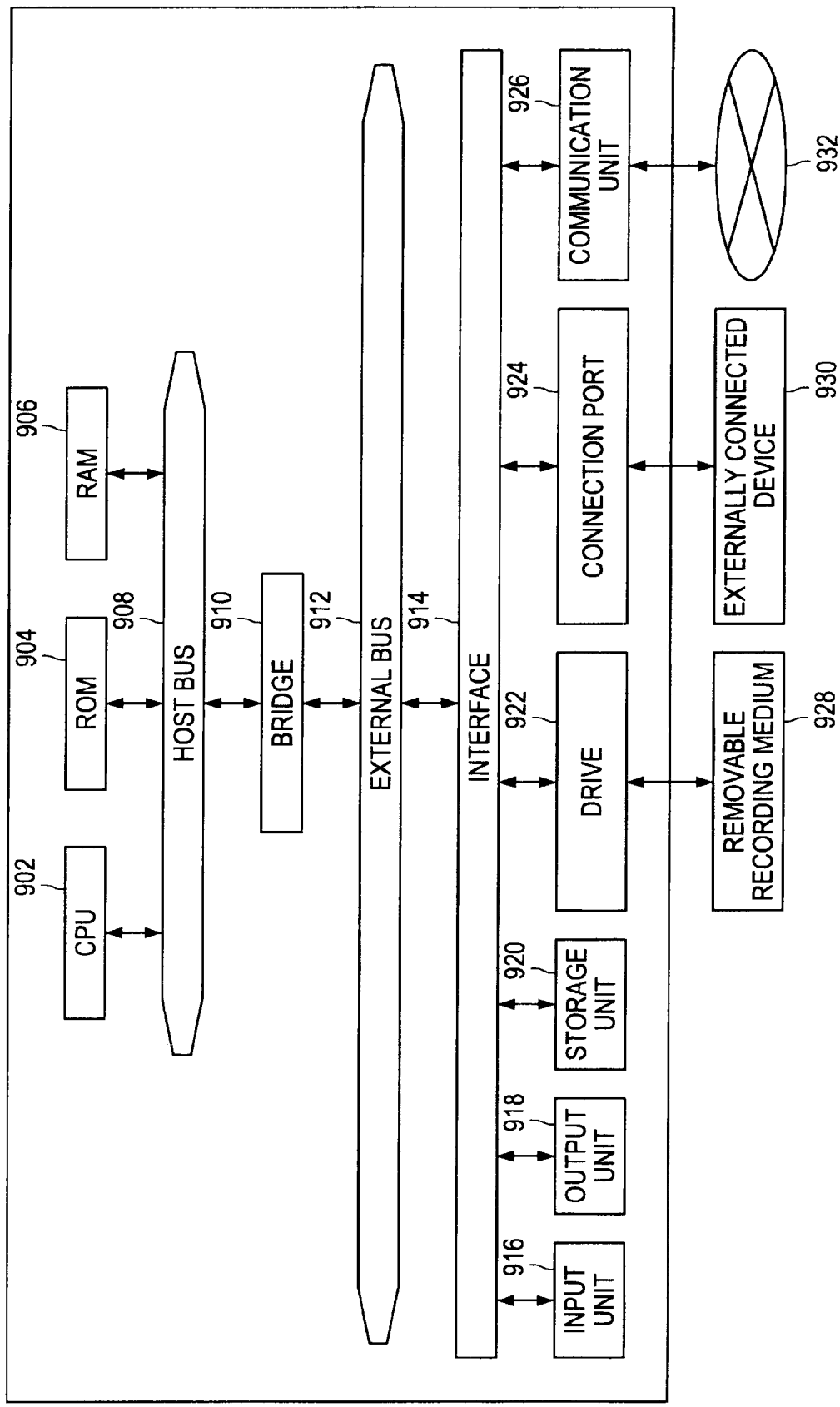
FIG. 9 is an explanatory view showing a hardware configuration example that can realize authentication processing and signature generation/signature verification processing according to the embodiment.

The above authentication processing and signature generation processing can be realized by using, for example, the hardware configuration illustrated in FIG. 9. That is, the function of each relevant component can be realized by controlling hardware shown in FIG. 9 using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 9, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls an entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an IC card on which a non-contact IC chip is mounted or an electronic device. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

4: CONCLUSION

Lastly, technical content according to an embodiment of the present invention will be summarized. As described above, the technology according to the present embodiment is applicable to motor-driven movable bodies. Motor-driven movable bodies here include, for example, electric vehicles, motor-driven bicycles, motor-driven ships, motor-driven planes, electric buses, and motor-driven freight cars. Moreover, motor-driven movable bodies to which the technology according to the present embodiment is applied do not have to be intended for riding. If the technology according to the present embodiment is applied to such an electric vehicle, the configuration thereof assumes the following.

A electric vehicle according to the present embodiment includes batteries to store power, an information transmission unit that transmits identification information of the electric vehicle and information about charged watt-hours by which the batteries are charged to a taxing server imposing a tax amount in accordance with the charged watt-hours when the batteries are charged, an information reception unit that receives a completion notification of taxing processing performed based on the identification information of the electric vehicle and the information about charged watt-hours transmitted by the information transmission unit from the taxing server, and a drive management unit that disables a driving mechanism during the charging and enables the driving mechanism after a completion notification is received by the information reception unit.

The electric vehicle has a function to transmit identification information and information about charged watt-hours to the taxing server through the information transmission unit. The electric vehicle also has a function to receive a completion notification of taxing processing through the information reception unit. Thus, the electric vehicle can directly exchange information about taxation with the taxing server. As a result, a taxer can impose taxes specific to the electric vehicle during charging without installing an outlet dedicated to charging the electric vehicle. Further, the electric vehicle can be charged using an outlet connectible to motor-driven equipment other than the electric vehicle, reducing costs necessary for provision of infrastructure of charging facilities.

The electric vehicle also has the drive management unit that disables the driving mechanism until taxing processing is completed. With the operation management of a driving function carried out by the drive management unit, an act to illegally evade taxing processing can be deterred. As a result, a mechanism to reliably collect taxes is realized.

(Notes)

The input/output unit 502 described above is an example of the information transmission unit, the information reception unit, the connection terminal, and the communication unit. The control unit 506 and the drive control unit 510 described above are examples of the drive management unit, the signature generation unit, the signature verification unit, and the mutual authentication unit. The drive control unit 510 described above is an example of the driving mechanism.

It should be understood by those skilled in the art that various modifications, combinations, sub-combinations and alterations may occur depending on design requirements and other factors insofar as they are within the scope of the appended claims or the equivalents thereof.

In the description of the above embodiment, for example, it is assumed that the electric vehicle 50 and the taxing server 20 communicate via the charging apparatus 40, but the communication method is not necessarily limited to this. If, for example, the electric vehicle 50 has a wireless or wire communication function and can connect to the network 30 without the aid of the charging apparatus 40, the electric vehicle 50 may be configured to communicate with the taxing server 20 without the aid of the charging apparatus 40.

The present application contains subject matter related to that disclosed in Japanese Priority Patent Application JP 2009-285441 filed in the Japan Patent Office on Dec. 16, 2009, the entire content of which is hereby incorporated by reference.

What is claimed is:

1. An electronic device comprising:
an interface configured to connect to a charging apparatus and exchange authentication information with a server via a network;
circuitry configured to control charging of a battery of the electronic device based on power received from the charging apparatus, wherein the interface is configured to transmit, to the server, information for calculating tax to the server and a first signature generated based on a first secret key assigned to the electronic device, wherein the first signature has a predetermined expiration date; and
receive, from the server, a completion notification upon completion of charging the battery of the electronic device and a second signature generated based on a second key assigned to the charging server, and
the circuitry is configured to verify a validity of the completion notification based on the second signature; and
enable a motor of the electronic device when the validity of the completion message is verified.

2. The electronic device according to claim 1, wherein
the information for calculating the tax is at least one of an amount of charge received by the battery, battery identification information, driver identification information and car identification information.

3. The electronic device of claim 1, wherein
the interface is configured to receive permission to initiate the charging of the battery upon an indication that authentication with the server is successful.

4. The electronic device of claim 1, wherein:
the circuitry is configured to disable a motor of the electronic device until the validity of the completion notification is verified.

5. The electronic device of claim 1, wherein
the interface is configured to exchange the authentication information with the server over the network via the charging apparatus.

6. The electronic device according to claim 1, wherein
the authentication information is generated based on the first secret key assigned to the electronic device.

7. The electronic device of claim 1, wherein
the information for calculating the tax is an amount of charge received by the battery.

8. A non-transitory computer-readable medium including computer program instructions, which when executed by an electronic device, cause the electronic device to perform a method comprising: connecting to a charging apparatus:
exchanging authentication information with a server via a network;
controlling charging of a battery of the electronic device based on power received from the charging apparatus;
transmitting information for calculating a tax and a first signature generated based on a first secret key assigned to the electronic device to the server, wherein the first signature has a predetermined expiration date;
receiving, from the server, a completion notification upon completion of charging the battery of the electronic device and a second signature generated based on a second keg assigned to the charging Server;
verifying a validity of the completion notification based on the second signature; and
enabling a motor of the electronic device when the validity of the completion message is verified.

9. A method performed by an electronic device, the method comprising:
connecting, by an interface of the electronic device, to a charging apparatus:
exchanging, by the interface, authentication information with a server via a network;
controlling, by circuitry of the electronic device, charging of a battery of the electronic device based on power received from the charging apparatus;
transmitting, by the interface, information for calculating a tax and a first signature generated based on a first secret key assigned to the electronic device to the server, wherein the first signature has a predetermined expiration date;
receiving, by the interface from the server, a completion notification upon completion of charging the battery of the electronic device and a second signature generated based on a second key assigned to the charging server;
verifying, by the circuitry, a validity of the completion notification based on the second signature; and
enabling, by the circuitry, a motor of the electronic device when the validity of the completion message is verified.

10. An electronic device comprising connecting, by an interface of the electronic device, to a charging apparatus; means for exchanging authentication information with a server via a network;
means for controlling charging of a battery of the electronic device based on power received from the charging apparatus;
means for transmitting information for calculating a tax and a first signature generated based on a first secret key assigned to the electronic device to the server, wherein the first signature has a predetermined expiration date;
means for receiving, from the server, a completion notification upon completion of charging the battery of the electronic device and a second signature generated based on a second key assigned to the charging server;
means for verifying a validity of the completion notification based on the second signature; and
means for enabling a motor of the electronic device when the validity of the completion message is verified.

11. A server comprising:
an interface configured to receive authentication information from an electronic device connected to a charging apparatus;
circuitry configured to perform authentication with the electronic device based on the authentication information, wherein the interface is configured to transmit permission to initiate charging to the electronic device based on a successful result of the authentication;
receive, from the electronic device, information for calculating a tax and a first signature generated based on a first secret key assigned to the electronic device, wherein the first signature has a predetermined expiration date;
transmit, to the electronic apparatus, a confirmation that the information for calculating the tax has been received; and
transmit, to the electronic device, a completion notification upon completion of charging the battery of the electronic device and a second signature generated based on a second key assigned to the charging server, wherein the electronic device verifies a validity of the completion notification based on the second signature and enables a motor of the electronic device when the validity of the completion message is verified.

12. The server of claim 11, wherein
the authentication information is generated based on the first secret key assigned to the electronic device.

13. A non-transitory computer-readable medium including computer program instructions, which when executed by a server, cause the server to perform a method comprising:
receiving authentication information from an electronic device connected to a charging apparatus;
performing authentication with the electronic device based on the authentication information;
transmitting permission to initiate charging to the electronic device based on a successful result of the authentication;
receiving, from the electronic device, information for calculating a tax and a first signature generated based on a first secret key assigned to the electronic device transmitting, to the electronic apparatus, a confirmation that the information for calculating the tax has been received, wherein the first signature has a predetermined expiration date; and
transmitting, to the electronic device, a completion notification upon completion of charging the battery of the electronic device and a second signature generated based on a second key assigned to the charging server, wherein the electronic device verifies a validity of the completion notification based on the second signature and enables a motor of the electronic device when the validity of the completion message is verified.

14. A method performed by a server, the method comprising:

receiving, by an interface of the server, authentication information from an electronic device connected to a charging apparatus;

performing, by an authentication unit of the server, authentication with the electronic device based on the authentication information;

transmitting, by the interface of the server, permission to initiate charging to the electronic device based on a successful result of the authentication;

receiving, by the interface of the server from the electronic device, information for calculating a tax and a first signature generated based on a first secret key assigned to the electronic device, wherein the first signature has a predetermined expiration date;

transmitting, by the interface of the server to the electronic apparatus, a confirmation that the information for calculating the tax has been received; and transmitting, by the interface of the server to the electronic device, a completion notification upon completion of charging the battery of the electronic device and a second signature generated based on a second key assigned to the charging server, wherein the electronic device verifies a validity of the completion notification based on the second signature and enables a motor of the electronic device when the validity of the completion message is verified.

15. A server comprising:

means for receiving authentication information from an electronic device connected to a charging apparatus;

means for performing authentication with the electronic device based on the authentication information;

means for transmitting permission to initiate charging to the electronic device based on a successful result of the authentication;

means for receiving, from the electronic device, information for calculating a tax and a first signature generated based on a first secret key assigned to the electronic device;

means for transmitting, to the electronic apparatus, a confirmation that the information for calculating the tax has been received; and means for transmitting, to the electronic device, a completion notification upon completion of charging the battery of the electronic device and a second signature generated based on a second key assigned to the charging server, wherein the electronic device verifies a validity of the completion notification based on the second signature and enables a motor of the electronic device when the validity of the completion message is verified.

16. A system comprising:

a first interface, at an electronic device, configured to connect to a charging apparatus and exchange authentication information with a server via a network;

a second interface, at the server, configured to receive the authentication information, and transmit permission to initiate charging to the electronic device based on a successful result of the authentication;

circuitry at the electronic device, configured to control charging of a battery of the electronic device based on power received from the charging apparatus and the permission received from the server, wherein the first interface is configured to transmit information for calculating a tax to the server and a first signature generated based on a first secret key assigned to the electronic device, wherein the first signature has a predetermined expiration date; and receive, from the server, a completion notification upon completion of charging the battery of the electronic device and a second signature generated based on a second key assigned to the charging server, and the circuitry is configured to verify a validity of the completion notification based on the second signature; and enable a motor of the electronic device when the validity of the completion message is verified.

* * * * *